United States Patent
Mori

(10) Patent No.: US 9,319,546 B2
(45) Date of Patent: Apr. 19, 2016

(54) READING APPARATUS

(71) Applicant: BROTHER KOGYO KABUSHIKI KAISHA, Nagoya-shi, Aichi-ken (JP)

(72) Inventor: Hiroko Mori, Handa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/613,836

(22) Filed: Feb. 4, 2015

(65) Prior Publication Data
US 2015/0222771 A1 Aug. 6, 2015

(30) Foreign Application Priority Data

Feb. 4, 2014 (JP) .................................. 2014-019243
Feb. 4, 2014 (JP) .................................. 2014-019244

(51) Int. Cl.
*H04N 1/04* (2006.01)
*H04N 1/00* (2006.01)
*H04N 1/12* (2006.01)

(52) U.S. Cl.
CPC ........... *H04N 1/00588* (2013.01); *H04N 1/121* (2013.01); *H04N 2201/0081* (2013.01)

(58) Field of Classification Search
CPC .............. H04N 1/00588; H04N 1/121; H04N 2201/0081; B65H 3/0684
USPC ............... 358/496, 498, 488, 486; 271/10.09, 271/10.11
See application file for complete search history.

(56) References Cited

U.S. PATENT DOCUMENTS

| | | | | |
|---|---|---|---|---|
| 2007/0081212 A1* | 4/2007 | Tonami | ................ | H04N 1/0035 359/197.1 |
| 2009/0160119 A1* | 6/2009 | Komuro | ............... | B65H 3/0684 271/10.11 |
| 2010/0074640 A1* | 3/2010 | Okano | ............... | G03G 15/6573 399/45 |
| 2013/0083366 A1* | 4/2013 | Motoyama | ............. | H04N 1/047 358/448 |

FOREIGN PATENT DOCUMENTS

JP 2000-318882 A 11/2000
JP 2001-160887 A 6/2001

* cited by examiner

*Primary Examiner* — Cheukfan Lee
(74) *Attorney, Agent, or Firm* — Merchant & Gould P.C.

(57) ABSTRACT

A reading apparatus including a reading device, a sheet tray, a conveyer, a receiving device, and a control device configured to execute, when the receiving device receives a read instruction, a conveying process of causing the conveyer to start conveyance of a sheet, execute a reading process of causing the reading device to read an image of the sheet passing a reading position of the reading device, execute a stop determining process of determining whether a stop condition of the conveyer is satisfied, and execute, in response to determining that the stop condition is satisfied, a stopping process of causing a leading edge of a next sheet to be stopped in a specific position which is any position between the sheet tray and the reading position.

23 Claims, 11 Drawing Sheets

READING APPARATUS

CROSS-REFERENCE TO RELATED APPLICATIONS

This application claims priority from Japanese Patent Application No. 2014-019243 filed on Feb. 4, 2014 and Japanese Patent Application No. 2014-019244 filed on Feb. 4, 2014, the entire contents of which are incorporated herein by reference.

TECHNICAL FIELD

The disclosure relates to a technology for reading the images of sheets which are conveyed.

BACKGROUND

There has been known a reading apparatus that conveys a sheet disposed on a platen to a position between the platen and a reading position of a reading device and temporarily stops the sheet at that position in advance. Thereafter, if a read instruction is received, the reading apparatus restarts conveyance of the sheet, and causes the reading device to read the image of the sheet while the sheet passes the reading position.

However, in the known reading apparatus, since sheets are temporarily stopped at the position between the platen and the reading position, some problems such as a problem in which a time which is required to read a plurality of sheets increases may occur.

Also, if the read instruction is received, while starting to convey a sheet from the temporary stopping position, the reading apparatus may start to convey another sheet from the platen. Meanwhile, in general, the reading apparatus performs an acquiring process such as adjustment of the amount of light of the reading device and shading data acquisition based on a read instruction before a sheet reaches the reading position. Here, if the time from when a read instruction is received to when conveyance of a sheet starts is fixed regardless of the position of the sheet when the conveyance starts due to the reception of the read instruction, there is a fear that a sheet may reach the reading position before the acquiring process is completed, or the time from when the read instruction is received to when the sheet is started to be read may become longer uniformly.

SUMMARY

Aspects of the disclosure provide a technology of suppressing sheets from being always stopped between a sheet tray and a reading device.

Further, aspects of the disclosure provide a technology of suppressing a time from when a read instruction is received to when the sheet is started to be read from becoming longer uniformly, while suppressing a sheet from reaching a reading position before an acquiring process is completed.

According to an aspect of the disclosure, there is provided a reading apparatus including: a reading device; a sheet tray; a conveyer; a receiving device; and a control device configured to: execute, when the receiving device receives a read instruction, a conveying process of causing the conveyer to perform a conveying operation of starting conveyance of a sheet, execute a reading process of causing the reading device to read an image of the sheet conveyed by the conveyer while the sheet is passing a reading position of the reading device, execute a stop determining process of determining whether a stop condition of the conveyer is satisfied, and execute, in response to determining in the stop determining process that the stop condition is satisfied, a stopping process of causing a leading edge of a next sheet, which is a sheet next to the sheet for which the reading process is executed, to be stopped in a specific position which is any position between the sheet tray and the reading position.

According to the reading apparatus, depending on whether the stop condition is satisfied, the leading edge of the next sheet is stopped in the specific position, or is not stopped. Therefore, it is possible to suppress sheets from being always stopped between a sheet tray and a reading device, resulting in problems.

The present invention can be implemented in various forms such as a reading apparatus, a reading method, a sheet conveying method, computer programs for implementing the functions of those methods or apparatus, and a storage medium having the computer program stored therein.

BRIEF DESCRIPTION OF DRAWINGS

FIG. 8 is a view for explaining a read range of an over-scan mode, an inter-sheet distance, and the like.

DETAILED DESCRIPTION

Figure 1:
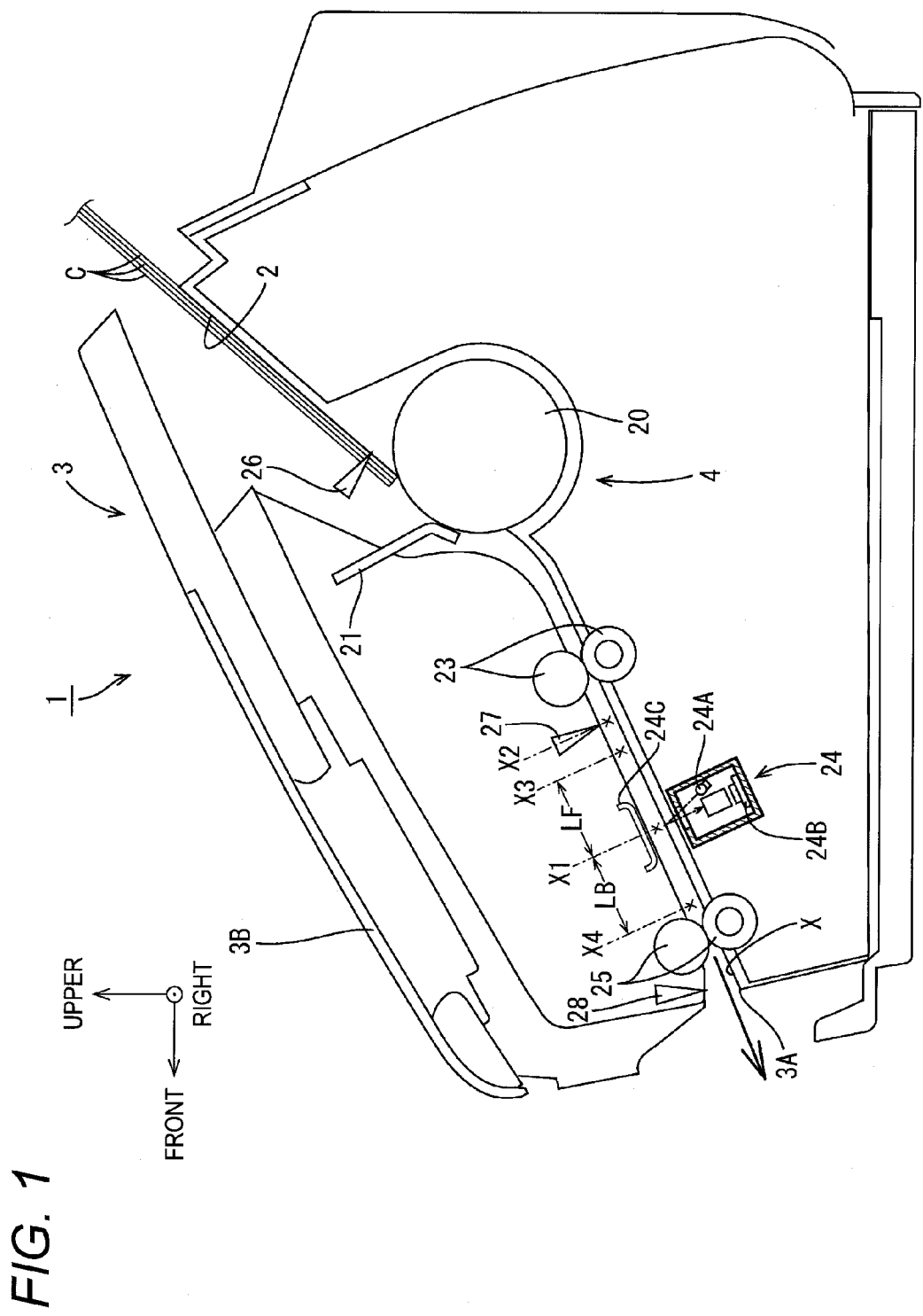
FIG. 1 is a view schematically illustrating the configuration of a scanner according to an embodiment.

A scanner 1 of an embodiment will be described with reference to FIGS. 1 to 9. In the following description, the left side of the drawing sheet of FIG. 1 is referred to as the front surface of the scanner 1, and a direction toward a front side of the drawing sheet is referred to as the right side of the scanner 1, and the upper side of the drawing sheet is referred to as the upper side of the scanner 1. Here, the scanner 1 is an example of a reading apparatus.

As shown in FIG. 1, the scanner 1 includes a document tray 2 and a main body unit 3. The scanner 1 is a sheet-fed scanner, which conveys sheets C disposed on the document tray 2 while reading images on the sheets C by a reading device 24, and then discharging the sheets C from an outlet 3A formed at the front side of the main body unit 3. Here, the sheets C may be formed of paper or any other material such as plastic.

The document tray 2 is an example of a sheet tray, and is provided at the rear side of the main body unit 3 such that its front side is inclined downward, and allows one or more sheets C to be disposed thereon. Inside the main body unit 3, a conveyance path X is formed so as to extend from the front end of the document tray 2 to the outlet 3A. Also, around the conveyance path X, there are provided a pickup roller 20, a separating pad 21, feed rollers 23, the reading device 24, discharging rollers 25, a front sensor 26, a rear sensor 27, and a cover sensor 28.

The pickup roller 20 is disposed at the front side of the document tray 2, and is driven by a motor 4A (see FIG. 2), thereby drawing one or more sheets C disposed on the document tray 2 into the main body unit 3 by a frictional force. The separating pad 21 is disposed so as to face the pickup roller 20, and separates the one or more sheets C drawn by the pickup roller 20 one by one by a frictional force. As a result, the one or more sheets C are conveyed one by one into the main body unit 3.

The feed rollers 23 are provided on the downstream side of the pickup roller 20 and the separating pad 21 in the conveyance path X and are driven by the motor 4A, thereby conveying each sheet C drawn by the pickup roller 20 and the separating pad 21 to the downstream side in the conveyance path X at a speed slightly higher than that of the pickup roller 20. Also, the pickup roller 20 is fit on its drive shaft (not shown) with a play gap in the rotation direction. While the pickup roller 20 is being driven by the drive shaft, thereby drawing sheets C, the play gap is 0. However, while a document is conveyed by the feed rollers 23, the play gap gradually increases due to conveyance speed difference between the feed rollers 23 and the pickup roller 20. Start of conveyance of the next document is delayed until the play gap between the drive shaft of the pickup roller 20 and the pickup roller 20 does not exist, whereby a gap between the documents is formed.

The reading device 24 is an example of a reading device, and is provided on the downstream side from the feed rollers 23 in the conveyance path X, and reads an image of one side (the lower side in FIG. 1) of each sheet C while the corresponding sheet C is conveyed by the feed rollers 23. The reading device 24 includes a light source 24A and a light receiving device 24B, and performs a reading operation in which the light source 24A radiates light toward a reading position X1 on the conveyance path X, and the light receiving device 24B receives light reflected from the reading position X1 and outputs read data according to the light reception result. Also, at a position facing the reading device 24 with the conveyance path X interposed therebetween, a white reference plate 24C is provided. Also, the light source 24A is, for example, a light emitting device (LED), and the reading device 24 has, for example, a configuration having a contact image sensor (CIS) or a charge coupled drive image sensor (CCD).

The discharging rollers 25 are provided on the downstream side of the reading device 24 in the conveyance path X, and discharge each sheet C to the outside of the main body unit 3 after an image of the corresponding sheet C is read by the reading device 24.

The front sensor 26 is provided at the front end side of the document tray 2 and outputs a detection signal SG1 according to whether there is a sheet C on the document tray 2. The rear sensor 27 is an example of a sensor, and outputs a detection signal SG2 according to whether there is any sheet C at a pre-reading position X2 between the document tray 2 and the reading position X1. The pre-reading position X2 is an example of a detection position. Also, the upper portion of the main body unit 3 is a cover 3B. The cover 3B can be opened and closed between a closed position that covers the conveyance path X shown in FIG. 1 and an opened position that exposes the conveyance path X. The cover sensor 28 outputs a detection signal SG3 according to whether the cover 3B is at the closed position or the opened position.

Figure 2:
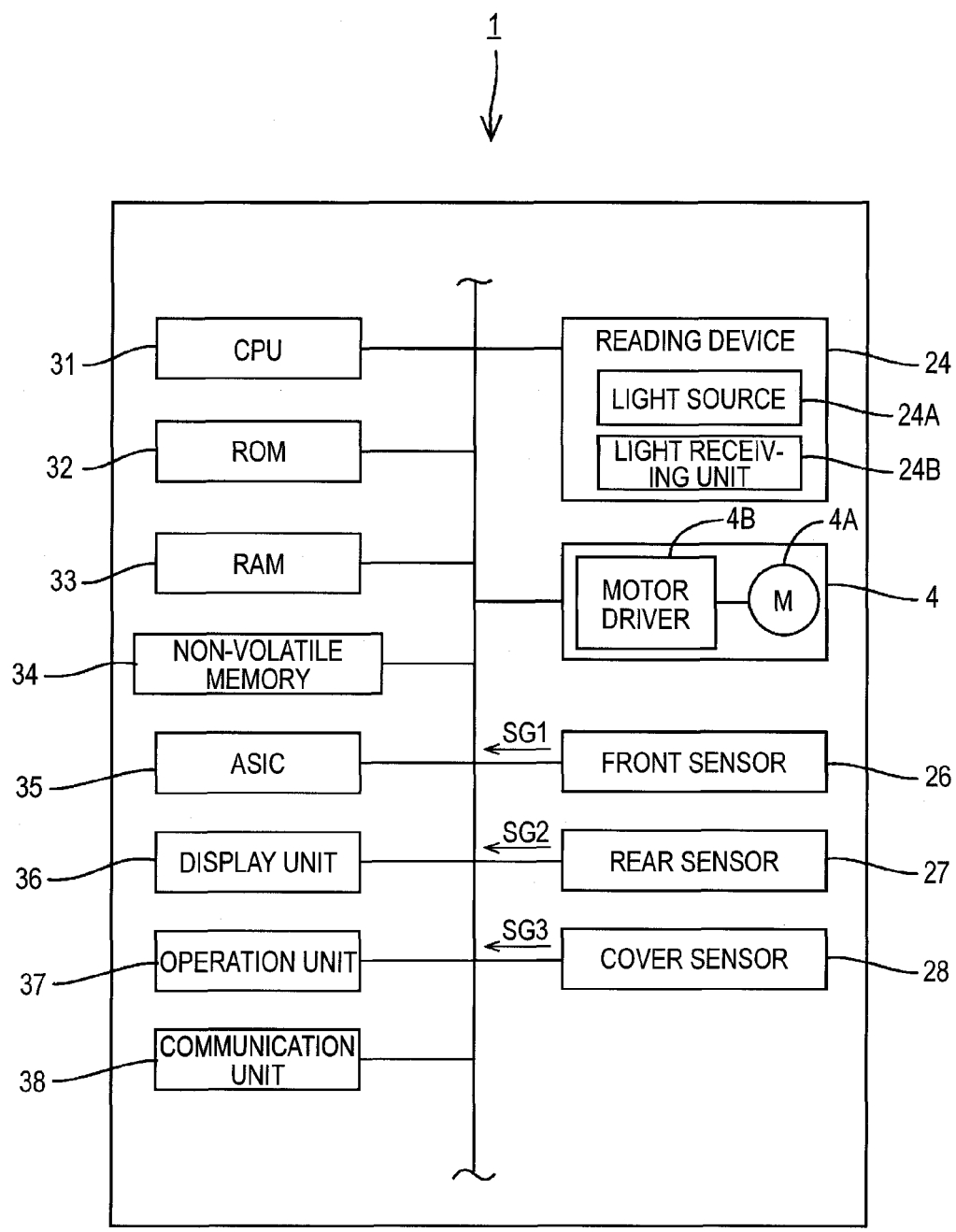
FIG. 2 is a block diagram illustrating the electrical configuration of the scanner.

As shown in FIG. 2, in addition to the above described reading device 24, a conveyer 4, the front sensor 26, the rear sensor 27, and the cover sensor 28, the scanner 1 includes a central processing unit (hereinafter, referred to as CPU) 31, a ROM 32, a RAM 33, a non-volatile memory 34, an application specific integrated circuit (ASIC) 35, a display unit 36, an operation unit 37, and a communication unit 38.

The conveyer 4 includes the pickup roller 20, the separating pad 21, the feed rollers 23, the discharging rollers 25, the motor 4A, and a motor driver 4B. The motor 4A is, for example, a stepping motor. For example, if a clock signal is input from the CPU 31, the motor driver 4B rotates the motor 4A by one step (a predetermined angle) for every pulse of the clock signal. The conveyer 4 performs a conveying operation of conveying one or more sheets C disposed on the document tray 2, one by one, toward the reading position X1.

Figure 8:
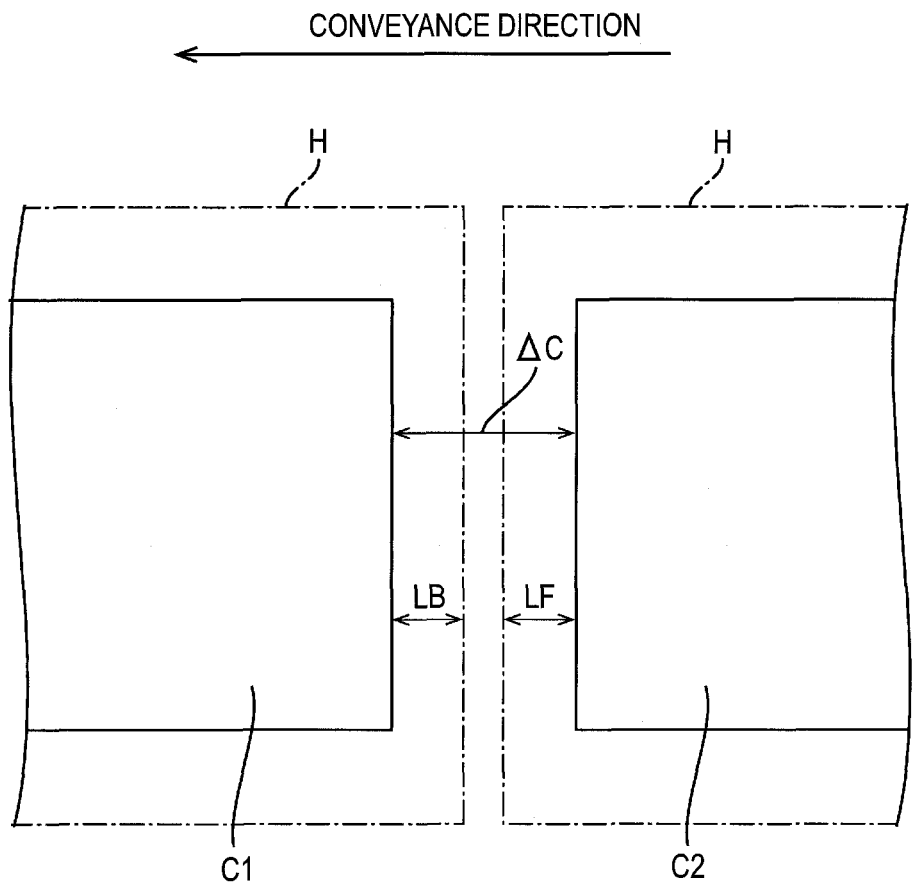

Also, in this conveying operation, as shown in FIG. 8, while the reading device 24 reads one sheet C1, the conveyer 4 may start to covey the next sheet C2 toward the reading position X1. As a result, when a read instruction is received, the following two cases can be assumed. The first case is a case in which the conveyer 4 starts to convey the sheet C while the sheet C is in a conveyance completion state where a leading edge of the sheet C is located between the document tray 2 and the reading position X1. The second case is a case where no sheet in the conveyance completion state and the conveyer 4 starts to convey a sheet from the document tray 2. Also, in this conveying mechanism, the shorter the dimension of the sheet C in the conveyance direction is, an amount of movement, in a direction in which the play gap with respect to the drive shaft of the pickup roller 20 by the sheet C increases, becomes smaller. In other words, as the play gap decreases, a time from when the drive shaft of the pickup roller 20 starts to rotate to when the pickup roller 20 actually starts to rotate decreases. A control process and the like to be described later are especially efficient for this kind of apparatus.

The ROM 32 stores a variety of programs. Examples of the variety of programs include a program for performing the control process and the like described later, and a program for controlling the operation of each unit of the scanner 1. The RAM 33 is used as a work area when the CPU 31 executes a variety of programs, or as an area for temporarily storing data.

The non-volatile memory 34 stores a conveyance completion flag and so on as will be described later. The non-volatile memory 34 is an example of a storage device, and needs only to be a rewritable memory such as a NAVRAM, a flash memory, an HDD, or an EPPROM.

The CPU 31 is an example of a control device, and is connected to the ROM 32, the RAM 33, and so on, and controls each unit of the scanner 1 according to programs read from the ROM 32. The ASIC 35 is a hardware circuit dedicated to image processing. The display unit 36 includes a liquid crystal display, a lamp, and the like, and can display various setting screens, the operating state of the apparatus, and so on.

The operation unit 37 is an example of a receiving device, and includes a plurality of buttons, and can receive various input instructions from a user. The communication unit 38 is an example of the receiving device, and is an interface for performing communication with external devices (not shown) by a wireless communication system or a wired communication system. The scanner 1 can use the operation unit 37 to receive a read instruction based on an input operation of the user, and can use the communication unit 38 to receive a read instruction transmitted from an external device.

Figure 3:
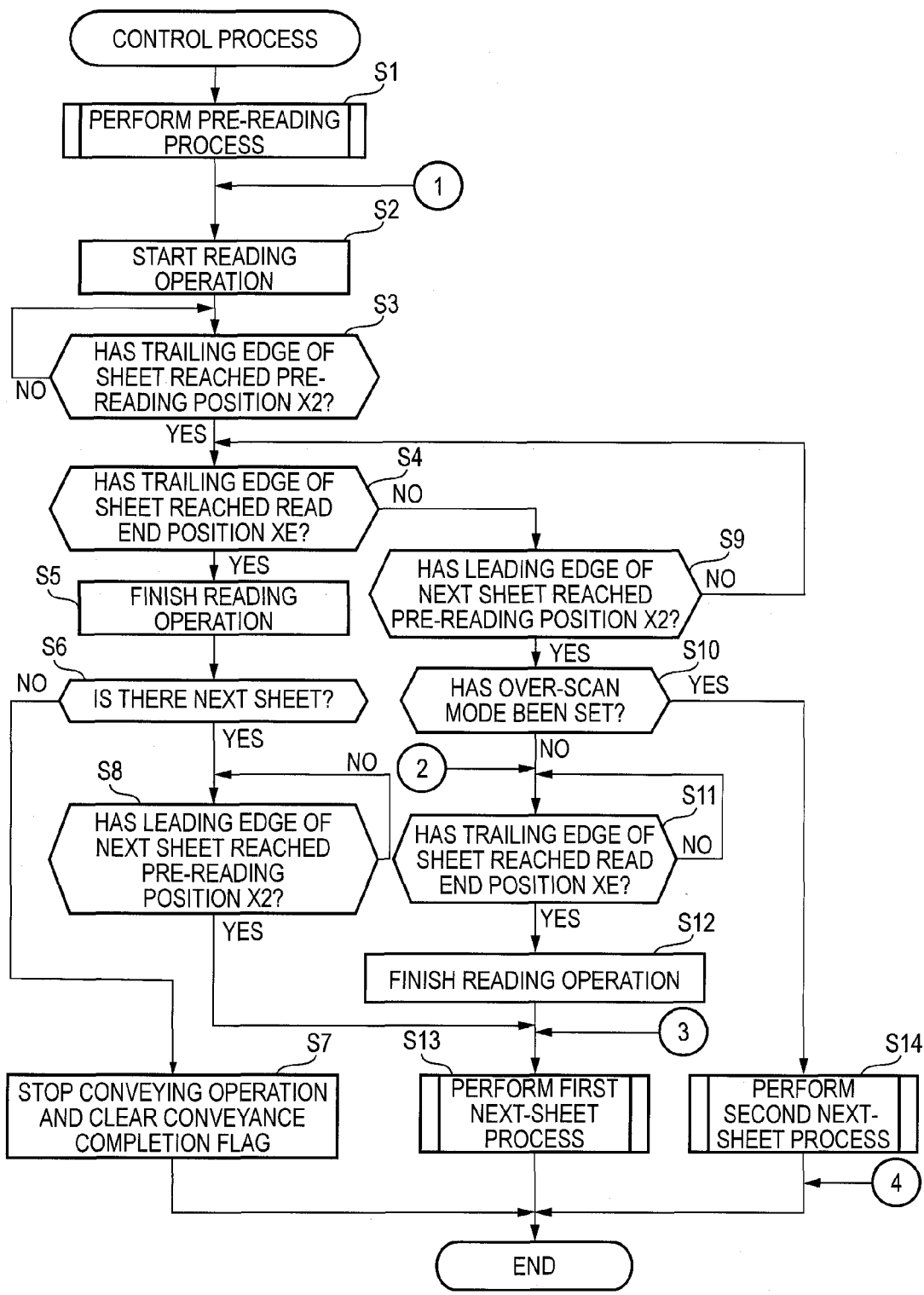
FIG. 3 is a flow chart illustrating a control process.

If the CPU 31 determines that the operation unit 37 or the communication unit 38 has received a read instruction and determines that there is a sheet on the document tray 2 based on the detection signal SG1 from the front sensor 26, the CPU 31 executes the control process shown in FIG. 3. A read instruction includes information relative to a variety of read options such as options for setting a color mode or a monochrome mode, options for setting resolutions, an option for setting an over-scan mode, and options for designating scan modes.

If the over-scan mode has not been set, the scanner 1 detects the leading edge and trailing edge of the sheet C based on the detection signal SG2 of the rear sensor 27, and controls the reading device 24 such that the reading device 24 performs a reading operation only for a period when the CPU determines that the sheet C is passing the reading position X1, based on the detection result, thereby reading an image of the same range as the size of the sheet C. This reading operation is an example of a non-over-scan mode reading operation. However, in this non-over-scan mode reading operation, if a sheet C is conveyed in a state where it is inclined with respect to the conveyance direction, a difference may occur between a timing when it is determined that the sheet C passes the reading position X1 and a timing when the sheet C actually passes the reading position X1. In this case, a portion of the sheet C may not be read.

Meanwhile, if the over-scan mode has been set, as shown in FIG. 8, the reading device 24 reads an image within an over-scan range H wider than the size of the sheet C. This reading operation is an example of an over-scan mode reading operation. Therefore, even if a sheet C is conveyed in an inclined state, it is possible to suppress the reading device from failing to read a portion of the image of the sheet. Hereinafter, a distance between the leading edges of a sheet C and the over-scan range H in the conveyance direction is referred to as a leading-edge over-distance LF, and a distance between the trailing edges of a sheet C and the over-scan range H in the conveyance direction is referred to as a trailing-edge over-distance LB.

Here, each of the initial values of the leading-edge over-distance LF and the trailing-edge over-distance LB is determined in advance according to the maximum dimension of a sheet in a main scan direction, and an inclination allowance range. The maximum dimension is a dimension of the largest sheet C, which can be read by the scanner 1, in the main scan direction. The inclination allowance range is a range of an inclination angle which can be corrected in an inclination correcting process of the CPU 31 on a read image.

The scan modes include a normal scan mode, an all-document scan mode, and a one-document scan mode.

If the normal scan mode is designated, in response to reception of a read instruction, the scanner 1 starts the above described conveying operation, reads the first sheet C, and then sequentially conveys and reads the other sheets C disposed on the document tray 2 without stopping the next sheet C. In this normal scan mode, in response to reception of a read instruction, the scanner performs a preparation process described later and performs reading of all sheets C based on the result of the preparation process. That is, the preparation process is performed only before the first sheet C of the sheets C disposed on the document tray 2 is read, and is not performed before reading of the second and subsequent sheets C. Also, the process which the CPU 31 executes if the normal scan mode is designated is an example of a second reading process.

If the all-document scan mode is designated, in response to reception of a read instruction, the scanner 1 starts the above described conveying operation, and reads the first sheet C, and temporarily stops the next sheet C, and restarts the conveying operation if the operation unit 37 or the like receives a restart instruction, without waiting for a new read instruction, as will be described later. In this all-document scan mode, like in the normal scan mode, the preparation process is performed only before the first sheet C of the sheets C disposed on the document tray 2 is read, and is not performed before reading of the second and subsequent sheets C. Also, the process which the CPU 31 executes if the all-document scan mode is designated is an example of the second reading process.

Figure 9A:
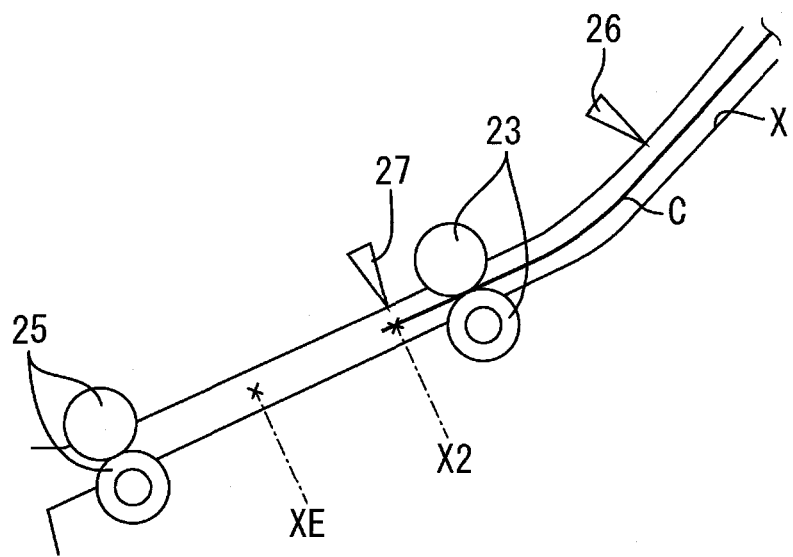
FIG. 9A is a schematic diagram illustrating the position of a sheet on a conveyance path.

If the one-document scan mode is designated, in response to reception of a read instruction, the scanner 1 starts the above described conveying operation, and reads the first sheet C, and temporarily stops the next sheet C in the conveyance completion state, and becomes a waiting state to wait for the next read instruction. As shown in FIG. 9A, the conveyance completion state means a state in which the leading edge of the next sheet C is already positioned between the document tray 2 and a read start position XS described later when a reading instruction is received, and the conveyance can be started from that position when a read instruction is received. Hereinafter, a position where a sheet C in the conveyance completion state is stopped will simply be referred to as a stopping position, and this stopping position depends on, for example, whether the over-scan mode has been designated.

In the one-document scan mode, since a read instruction is individually issued for reading each sheet C, it is possible to differently set read options each time a sheet C is read. Also, in the one-document scan mode, in response to reception of read instructions, the preparation process is performed only not before reading of the first sheet C of the sheets C disposed on the document tray 2, but also before reading of each of the second and subsequent sheets C. Here, the process which the CPU 31 executes if the one-document scan mode is designated is an example of a first reading process.

Figure 4:
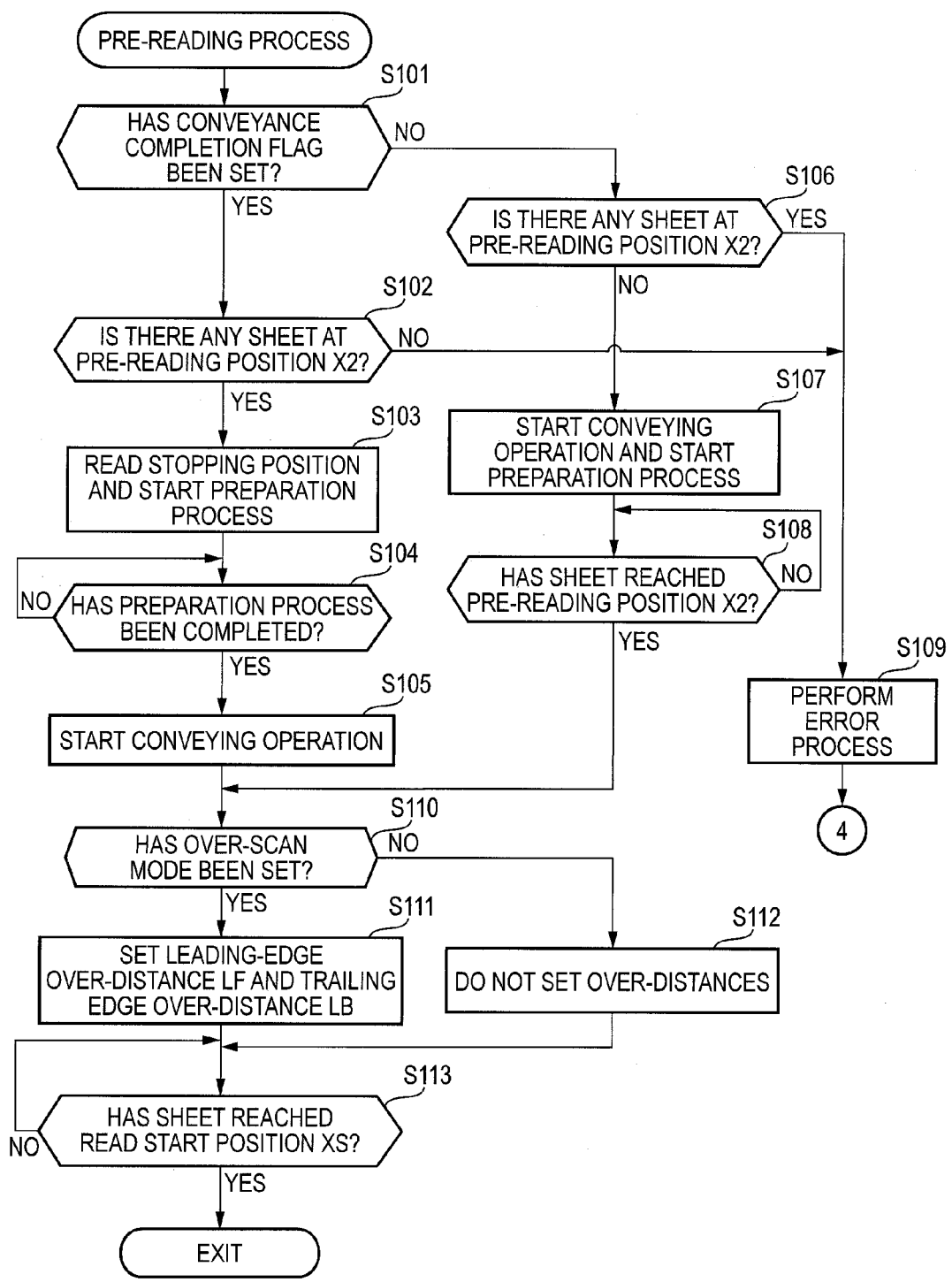
FIG. 4 is a flow chart illustrating a pre-reading process.

In STEP S1 of FIG. 3, the CPU 31 executes the pre-reading process shown in FIG. 4. If the operation unit 37 or the like receives a read instruction, the CPU 31 determines whether there is a sheet C in the conveyance completion state in STEPS S101 and S102. The processes of STEPS S101 and S102 are an example of a conveyance determining process.

Specifically, in STEP S101, the CPU 31 determines whether a conveyance completion flag has been set, for example, by referring to the non-volatile memory 34. As will be described later, if the next sheet C2 is detected at the pre-reading position X2 as shown in some drawings such as FIG. 9A, and it is determined that the one-document scan mode has been designated ("YES" in STEP S8 of FIG. 3 and "YES" in STEP S202 of FIG. 5), the CPU 31 sets the conveyance completion flag in STEP S204.

Also, in STEP S102, based on the detection signal SG2 of the rear sensor 27, the CPU 31 determines whether there is a sheet C at the pre-reading position X2. A case where the conveyance completion flag has been set and there is a sheet C at the pre-reading position X2 means a case where the sheet C is actually in the conveyance completion state. Therefore, if it is determined that the conveyance completion flag has been set and there is a sheet C at the pre-reading position X2 ("YES" in STEP S101 and "YES" in STEP S102), the CPU 31 proceeds to STEP S103. Accordingly, as compared to a case where only information on whether information representing that a sheet is in the conveyance completion state has been stored in the non-volatile memory 34 is used, it is possible to accurately determine whether a sheet C is in the conveyance completion state when a read instruction is received.

In STEP S103, the CPU 31 reads stopping position information, for example, from the non-volatile memory 34, and starts the preparation process. The stopping position information is information about the position of the leading edge of the sheet C at the time of stopping of the conveying operation in STEP S203 of FIG. 5, described later. The preparation process is an example of an acquiring process, and is performed in response to reception of a read instruction before reading of a sheet C. In a case of receiving a read instruction, there is a possibility that a new read condition has been designated in the read instruction. For this reason, in order to control the reading device 24 such that the reading device performs a reading operation under the new read condition, the preparation process is performed.

Examples of the preparation process include a process of adjusting an amount of light and a process of acquiring shading data. The process of adjusting an amount of light is performed in a state where there is no sheet C at the reading position X1. In this process, the light source 24A emits light, and the light receiving device 24B receives light reflected from the white reference plate 24C, and based on the amount of light received, the amount of light of the light source 24A is adjusted to a target amount. The process of acquiring shading data is performed in a state where there is no sheet C at the reading position X1. In this process, the light source 24A emits light, and the light receiving device 24B receives light reflected from the white reference plate 24C, and based on the amount of light received, white reference data for shading correction is acquired.

After start of the preparation process, in STEP S104, the CPU 31 determines whether the preparation process has been completed. If it is determined that the preparation process has not been completed ("NO" in STEP S104), the CPU 31 waits. Meanwhile, if it is determined that the preparation process has been completed ("YES" in STEP S104), the CPU 31 controls the conveyer 4 in STEP S105 such that the conveyer starts the conveying operation, and then proceeds to STEP S110. In a case of starting the conveying operation from the conveyance completion state, since a distance from the conveyance start position of the sheet C to the reading position X1 is short, the sheet C is likely to reach the reading position X1 before the preparation process is completed, and thus the preparation process is unlikely to be finished. For this reason, based on reception of the read instruction, first, the CPU 31 executes the preparation process, and if the preparation process has completed, the CPU 31 controls the conveyer such that the conveyer 4 starts conveyance of the sheet C being in the conveyance completion state.

Meanwhile, a case where the conveyance completion flag has been set and there is no sheet C at the pre-reading position X2 means, for example, a case where there is a possibility that a sheet C in the conveyance completion state has been removed by the user. Therefore, if it is determined that the conveyance completion flag has been set and there is no sheet C at the pre-reading position X2 ("YES" in STEP S101 and "NO" in STEP S102), the CPU 31 executes an error process (in STEP S109), and finishes the control process. Examples of the error process include a process of controlling the display unit 36 such that the display unit displays the error information, a process of notifying the error information to an external device through the communication unit 38, and a process of stopping the conveying operation or the reading operation. Therefore, it is possible to notify the user or the like of an abnormal state, for example, that a sheet C is removed from the stopping position before a read instruction is received.

If it is determined in STEP S101 that the conveyance completion flag has not been set ("NO" in STEP S101), in STEP S106, based on the detection signal SG2 of the rear sensor 27, the CPU 31 determines whether there is a sheet C at the pre-reading position X2. A case where the conveyance completion flag has not been set and there is no sheet C at the pre-reading position X2 means a case where there is no sheet C being in the conveyance completion state as shown in FIG. 1. Therefore, if a read instruction is received, conveyance of a sheet C from the document tray 2 starts.

In this case, since a distance from the conveyance start position of the sheet C to the reading position X1 is long, even if the conveying operation starts without waiting for completion of the preparation process, the sheet C is unlikely to reach the reading position X1 before the preparation process is completed, and thus the preparation process is likely to be finished. For this reason, if it is determined that the conveyance completion flag has not been set and there is no sheet C at the pre-reading position X2 ("NO" in STEP S101 and "NO" in STEP S106), in response to reception of the read instruction, in STEP S107, the CPU 31 starts the preparation process and controls the conveyer 4 such that the conveyer 4 starts the conveying operation, without waiting for completion of the preparation process. Here, the CPU 31 may control the conveyer 4 such that the conveyer 4 stops the conveying operation and wait for the preparation process to be completed, after the preparation process starts and if it is determined that a sheet C has reached the pre-reading position X2 before completion of the preparation process.

As described above, in a case where it is determined that there is a sheet C in the conveyance completion state ("YES" in STEP S101 and "YES" in STEP S102), in STEPS S103 to 105, or STEP S107, the CPU 31 makes the time until starting of conveyance of the sheet C after reception of a read instruction by the operation unit 37 or the like to be longer than that in a case where it is determined that there is no sheet C is in the conveyance completion state ("NO" in STEP S101 and "NO" in STEP S106). These processes are an example of a second time changing process. Therefore, as compared to a case where the time from when a read instruction is received to when conveyance of a sheet starts is fixed regardless of the conveyance start position of the sheet, it is possible to suppress the time from when the read instruction is received to when the sheet is started to be read from becoming longer uniformly, while suppressing a sheet from reaching the reading position X1 before the preparation process is completed.

After the conveying operation starts in STEP S107, in STEP S108, based on the detection signal SG2 of the rear sensor 27, the CPU 31 determines whether a sheet C has reached the pre-reading position X2. If it is determined that no sheet C has reached the pre-reading position X2 ("NO" in STEP S108), the CPU 31 waits. Meanwhile, if it is determined that a sheet C has reached the pre-reading position X2 ("YES" in STEP S108), the CPU 31 proceeds to STEP S110. Here, a case where the conveyance completion state has not been set and there is a sheet C at the pre-reading position X2 means, for example, a case where the CPU 31 has determined that the cover 3B had been opened and closed ("YES" in STEP S402) and has cleared the conveyance completion flag, as will be described later. Therefore, if it is determined that the conveyance completion state has not been set and there is a sheet C at the pre-reading position X2 ("NO" in STEP S101 and "YES" in STEP S106), the CPU 31 proceeds to STEP S109.

In STEP S110, the CPU 31 determines whether the over-scan mode has been set in the read instruction. This process is an example of an over-scan mode determining process. If it is determined that the over-scan mode has been set ("YES" in STEP S110), the CPU 31 sets the leading-edge over-distance LF and the trailing-edge over-distance LB to their initial values, respectively, in STEP S111, and then proceeds to STEP S113. Meanwhile, if it is determined that the over-scan mode has not been set ("NO" in STEP S110), the CPU 31 does not set a value to the leading-edge over-distance LF and the trailing-edge over-distance LB in STEP S112, and then proceeds to STEP S113. Here, not setting a value to the leading-edge over-distance LF and the trailing-edge over-distance LB in STEP S112 may include setting zero to the leading-edge over-distance LF and the trailing-edge over-distance LB.

In STEP S113, the CPU 31 determines whether the leading edge of the sheet C has reached a read start position XS. Here, in a case where the over-scan mode has been set, the read start position XS is a leading-edge over-scan position X3 located upstream to the reading position X1 in the conveyance direction of the sheet C by the leading-edge over-distance LF (see FIG. 1), and in a case where the over-scan mode has not been set, the read start position XS is the reading position X1. Here, at least in a case where the one-document scan mode has been designated ("YES" in STEP S202 described later), the read start position XS may be located slightly upstream to the reading position X1. Accordingly, even if a sheet C being in the conveyance completion state is inclined, it is possible to suppress the leading edge of the sheet C from exceeding the reading position X1 such that the preparation process cannot be performed.

Based on the number of steps of the motor 4A after start of the above described conveying operation (STEPS S105 and S107), the CPU 31 determines whether the leading edge of the sheet C has reached the read start position XS. If it is determined that the leading edge of the sheet C has not reached the read start position XS ("NO" in STEP S113), the CPU 31 waits. Meanwhile, if it is determined that the leading edge of the sheet C has reached the read start position XS ("YES" in STEP S113), the CPU 31 finishes the preparation process, and proceeds to STEP S2 of FIG. 3.

Figure 9B:
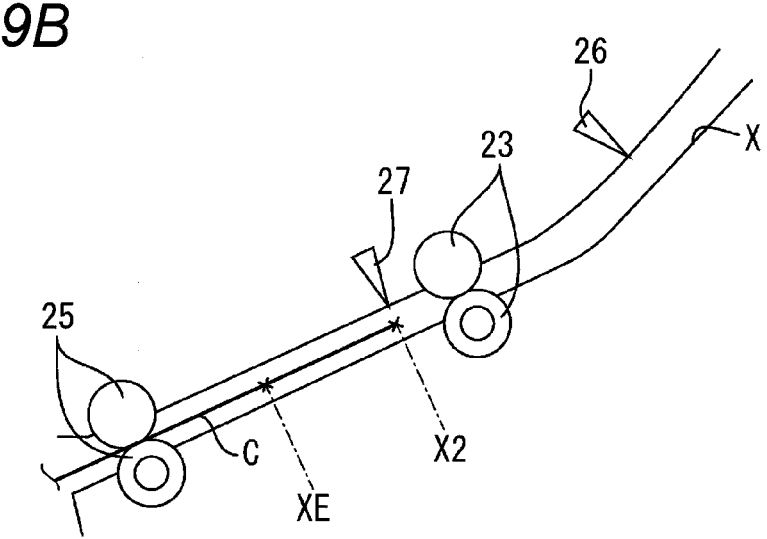
FIG. 9B is a schematic diagram illustrating the position of a sheet on the conveyance path.

In STEP S2, the CPU 31 controls the reading device 24 such that the reading device 24 starts the above described reading operation. This process is an example of a reading operation. Thereafter, in STEP S3, based on the detection signal SG2 of the rear sensor 27, the CPU 31 determines whether the trailing edge of the sheet C has reached the pre-reading position X2. If it is determined that the trailing edge of the sheet C has not reached the pre-reading position X2 ("NO" in STEP S3), the CPU 31 waits. Meanwhile, if it is determined that the trailing edge of the sheet C has reached the pre-reading position X2 as shown in FIG. 9B ("YES" in STEP S3), in STEP S4, the CPU 31 determines whether the trailing edge of the sheet C has reached a read end position XE.

Here, in a case where the over-scan mode has been set, the read end position XE is a trailing-edge over-scan position X4 located downstream to the reading position X1 by the trailing-edge over-distance LB (see FIG. 1), and in a case where the over-scan mode has not been set, the read end position XE is the reading position X1. Based on the number of steps of the motor 4A after it was determined that the trailing edge of the sheet C being read has reached the pre-reading position X2, the CPU 31 determines whether the trailing edge of the sheet C has reached the read end position XE.

Figure 9C:
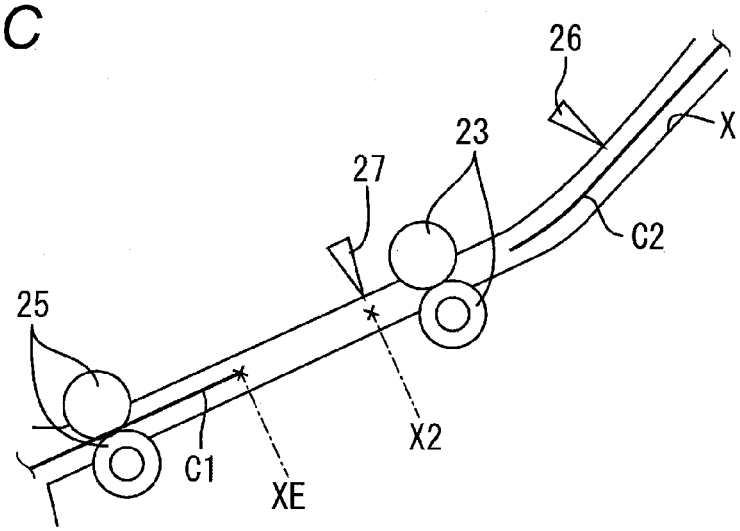
FIG. 9C is a schematic diagram illustrating the positions of sheets on the conveyance path.

Since an inter-sheet distance ΔC is comparatively long as shown in FIG. 9C, after reading of one sheet C1 finishes, if the next sheet C2 reaches the pre-reading position X2, the CPU 31 executes the next process. If it is determined in STEP S4 that the trailing edge of the sheet C1 being read has reached the read end position ("YES" in STEP S4), in STEP S5, the CPU 31 controls the reading device 24 such that the reading device finishes the reading operation.

Next, in STEP S6, based on the detection signal SG1 of the front sensor 26, the CPU 31 determines whether there is a next sheet C2 on the document tray 2. If it is determined that there is no next sheet C2 ("NO" in STEP S6), in STEP S7, the CPU 31 controls the conveyer 4 such that the conveyer 4 conveys the sheet C1 having been read to a position for discharging it from the outlet 3A, and then stops the conveying operation. Then, the CPU 31 finishes the control process, and becomes a waiting state for waiting for the next read instruction. Also, in STEP S7, if the conveyance completion flag has been set, the CPU 31 clears the conveyance completion flag.

If it is determined that there is a next sheet C2 on the document tray 2 ("YES" in STEP S6), in STEP S8, based on the detection signal SG2 of the rear sensor 27, the CPU 31 determines whether the leading edge of the next sheet C2 has reached the pre-reading position X2. This process is an example of a detecting process. Accordingly, by detecting that the leading edge of a sheet C is between the document tray 2 and the reading position X1 based on the detection signal SG2 of the rear sensor 27, in STEP S203 of FIG. 5 described later, it is possible to reliably stop the sheet C in the conveyance completion state. If it is determined that the next sheet C2 has not reached the pre-reading position X2 ("NO" in STEP S8), the CPU 31 waits. Meanwhile, if it is determined that the next sheet C2 has reached the pre-reading position X2 ("YES" in STEP S8), in STEP S13, the CPU 31 executes a first next-sheet process shown in FIG. 5.

Subsequently, the first next-sheet process will be described with reference to FIG. 5. In STEP S201, the CPU 31 determines whether the leading edge of the next sheet C2 has reached the above described read start position XS. If it is determined that the leading edge of the next sheet C2 has not reached the above described read start position XS ("NO" in STEP S201), the CPU 31 waits. Meanwhile, if it is determined that the leading edge of the next sheet C2 has reached the above described read start position XS ("YES" in STEP S201), in STEP S202, the CPU 31 determines whether the one-document scan mode has been designated in the read instruction. The condition in which the one-document scan mode has been designated is an example of a stop condition, and the process of STEP S202 is an example of a stop determining process and a read determining process.

Figure 9D:
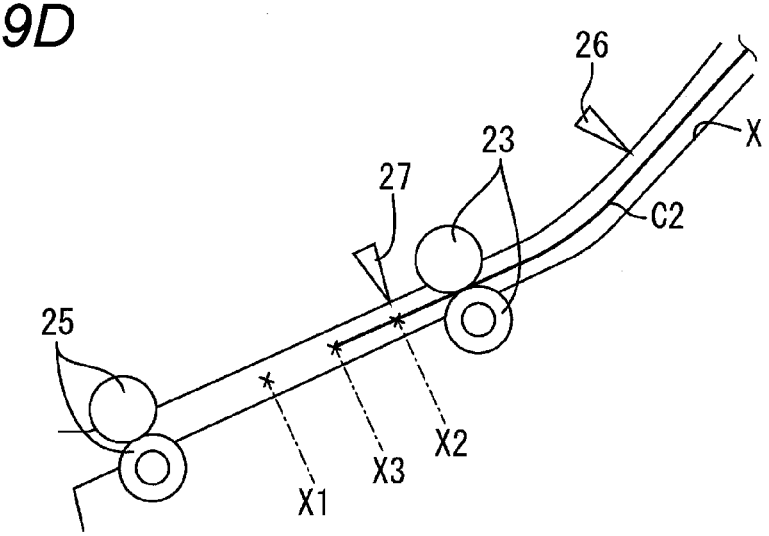
FIG. 9D is a schematic diagram illustrating the position of a sheet on the conveyance path.

If it is determined that the one-document scan mode has been designated ("YES" in STEP S202), in STEP S203, the CPU 31 controls the conveyer 4 such that the conveyer 4 stops the conveying operation. This process is an example of a stopping process. Here, in a case where the over-scan mode has been set with respect to the sheet C1 being read, the next sheet C2 is stopped if its leading edge reaches at the leading-edge over-scan position X3 (see FIG. 1) as shown in FIG. 9D. That is, the conveyance completion state of that case becomes a state where the leading edge of the next sheet C2 has reached the leading-edge over-scan position X3. Therefore, as compared to a case where the conveyance completion state is defined as a state where the leading edge of the next sheet C2 has reached a position located upstream to the leading-edge over-scan position X3, it is possible to start reading of the next sheet C2 earlier.

Figure 9E:
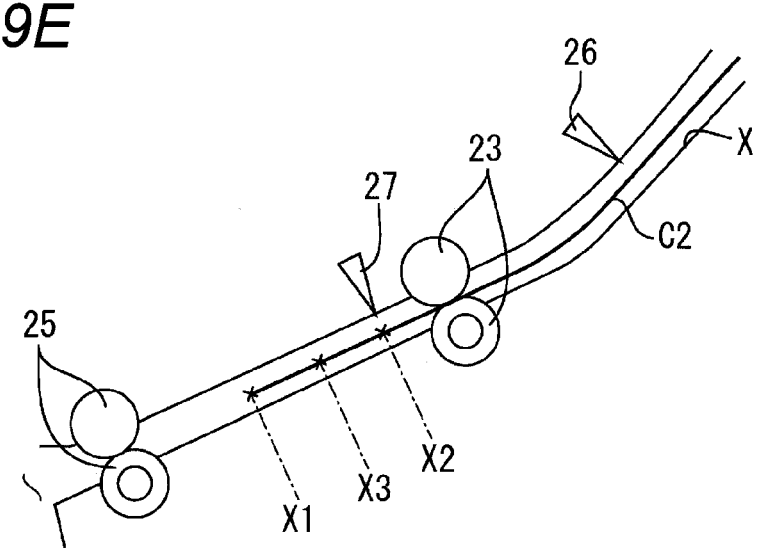
FIG. 9E is a schematic diagram illustrating the position of a sheet on the conveyance path.

Meanwhile, in a case where the over-scan mode has not been set with respect to the sheet C1 being read ("NO" in STEP S110), as shown in FIG. 9E, the next sheet C2 is stopped if its leading edge reaches the reading position X1. That is, in a case where the over-scan mode has been set ("YES" in STEP S110), a sheet C is stopped at a more upstream side as compared to a case where the over-scan mode has not been set ("NO" in STEP S110). Therefore, as compared to a configuration where a sheet C is stopped at the same position as that in a case where the over-scan mode has been set even in a case where the over-scan mode has not been set, it is possible to start reading of the sheet C earlier after reception of a read instruction.

Also, in STEP S203, the CPU 31 stores stopping position information relative to the stopping position of the next sheet C2, for example, in the non-volatile memory 34. For example, the CPU 31 starts to count the number of steps of the motor 4A from when the next sheet C2 has reached the pre-reading position X2 ("YES" in STEP S8 of FIG. 3), and uses the count value of the number of steps during stopping of the conveying operation, as the stopping position information.

Next, the CPU 31 sets the conveyance completion flag, for example, in the non-volatile memory 34, in STEP S204, and then finishes the first next-sheet process and the control process. The process of STEP S204 is an example of a storing process. As described above, in a case where the one-document scan mode has been designated, the next sheet C2 is stopped in the conveyance completion state, and the CPU 31 becomes a waiting state to wait for the next read instruction. Therefore, in the read instruction relative to the next sheet C2, the user can designate read options different from those for reading the sheet C1.

If it is determined in STEP S202 that the one-document scan mode has not been designated ("NO" in STEP S202), in STEP S205, if the conveyance completion flag has been set, the CPU 31 clears the conveyance completion flag. Next, in STEP S206, the CPU 31 determines whether the all-document scan mode has been designated in the read instruction. If it is determined that the all-document scan mode has been designated ("YES" in STEP S206), in STEP S207, the CPU 31 controls the conveyer 4 such that the conveyer 4 temporarily stops the conveying operation. Thereafter, in STEP S208, the CPU 31 determines whether the operation unit 37 or the communication unit 38 has received any restart instruction.

If it is determined that a restart instruction has not been received ("NO" in STEP S208), the CPU 31 waits. Meanwhile, if it is determined that a restart instruction has been received ("YES" in STEP S208), in STEP S209, the CPU 31 controls the conveyer 4 such that the conveyer 4 restarts the conveying operation. Then, the CPU 31 proceeds to STEP S2 of FIG. 3 in which the CPU 31 controls the reading device 24 such that the reading device starts the reading operation. Meanwhile, if it is determined that the all-document scan mode has not been designated ("NO" in STEP S206), the CPU 31 proceeds to STEP S1 of FIG. 2 while controlling the conveyer 4 such that the conveyer 4 continues the conveying operation. In STEP S2, the CPU 31 controls the reading device 24 such that the reading device starts the reading operation.

As described above, in a case where it is determined that the one-document scan mode has been designated ("YES" in STEP S202), if the control process is started in response to reception of the read instruction and the preparation process is completed ("YES" in STEP S104), in STEP S105, the CPU 31 controls the conveyer 4 such that the conveyer 4 starts the conveying operation. Meanwhile, in a case where it is determined that the one-document scan mode has not been designated ("NO" in STEP S202), when a restart instruction is received ("YES" in STEP S208), in STEP S209, the CPU 31 controls the conveyer 4 such that the conveyer 4 starts the conveying operation.

That is, in a case where it is determined that the one-document scan mode has not been designated, the CPU 31 sets a time until starting of conveyance of a sheet C after reception of a read instruction or the restart instruction by the operation unit 37 or the like to be shorter than that in a case where it is determined that the one-document scan mode has been designated. Therefore, even in a case where the one-document scan mode has not been designated and thus it is unnecessary to perform the preparation process, the time from when read instructions or the like are received to when reading of the sheets C are started can be suppressed from becoming longer uniformly. Also, in a case where the one-document scan mode has been designated, even if the over-scan mode is set with respect to the next sheet C2, it is possible to stop the next sheet C2 at a position where over-scan can be performed.

Figure 9F:
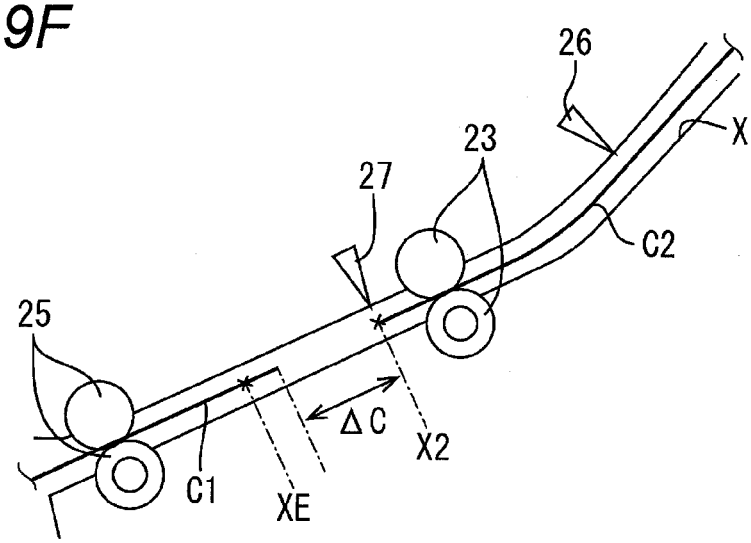
FIG. 9F is a schematic diagram illustrating the positions of sheets on the conveyance path.

Since the inter-sheet distance ΔC is comparatively short as shown in FIG. 9F, in a case where the next sheet C2 reaches the pre-reading position X2 before reading of the first sheet C1 is completed, the CPU 31 executes the following process. If it is determined in STEP S4 that the trailing edge of the sheet C1 being read has not reached the read end position XE ("NO" in STEP S4), in STEP S9, the CPU 31 determines whether the leading edge of the next sheet C2 has reached the pre-reading position X2 based on the detection signal SG2 of the rear sensor 27.

If it is determined that the next sheet C2 has not reached the pre-reading position X2 ("NO" in STEP S9), the CPU 31 returns to STEP S4. Meanwhile, if it is determined that the next sheet C2 has reached the pre-reading position X2 ("YES" in STEP S9), in STEP S10, the CPU 31 determines whether the over-scan mode has been set in the read instruction. This process is an example of the over-scan mode determining process.

If it is determined that the over-scan mode has not been set ("NO" in STEP S10), in STEP S11, like in STEP S4 described above, the CPU 31 determines whether the trailing edge of the sheet C1 being read has reached the read end position XE. If it is determined that the trailing edge of the sheet C1 being read has not reached the read end position XE ("NO" in STEP S11), the CPU 31 waits. Meanwhile, if it is determined that the trailing edge of the sheet C1 being read has reached the read end position XE ("YES" in STEP S11), in STEP S12, the CPU 31 controls the reading device 24 such that the reading device finishes the reading operation. Then, the CPU 31 proceeds to STEP S13 and executes the first next-sheet process described above. Also, in this case, in the first next-sheet process, since the over-scan mode has not been set, if the one-document scan mode has been designated ("YES" in STEP S202), in STEP S203, the next sheet C2 is stopped if its leading edge is at the reading position X1 as shown in FIG. 9E.

Figure 6:
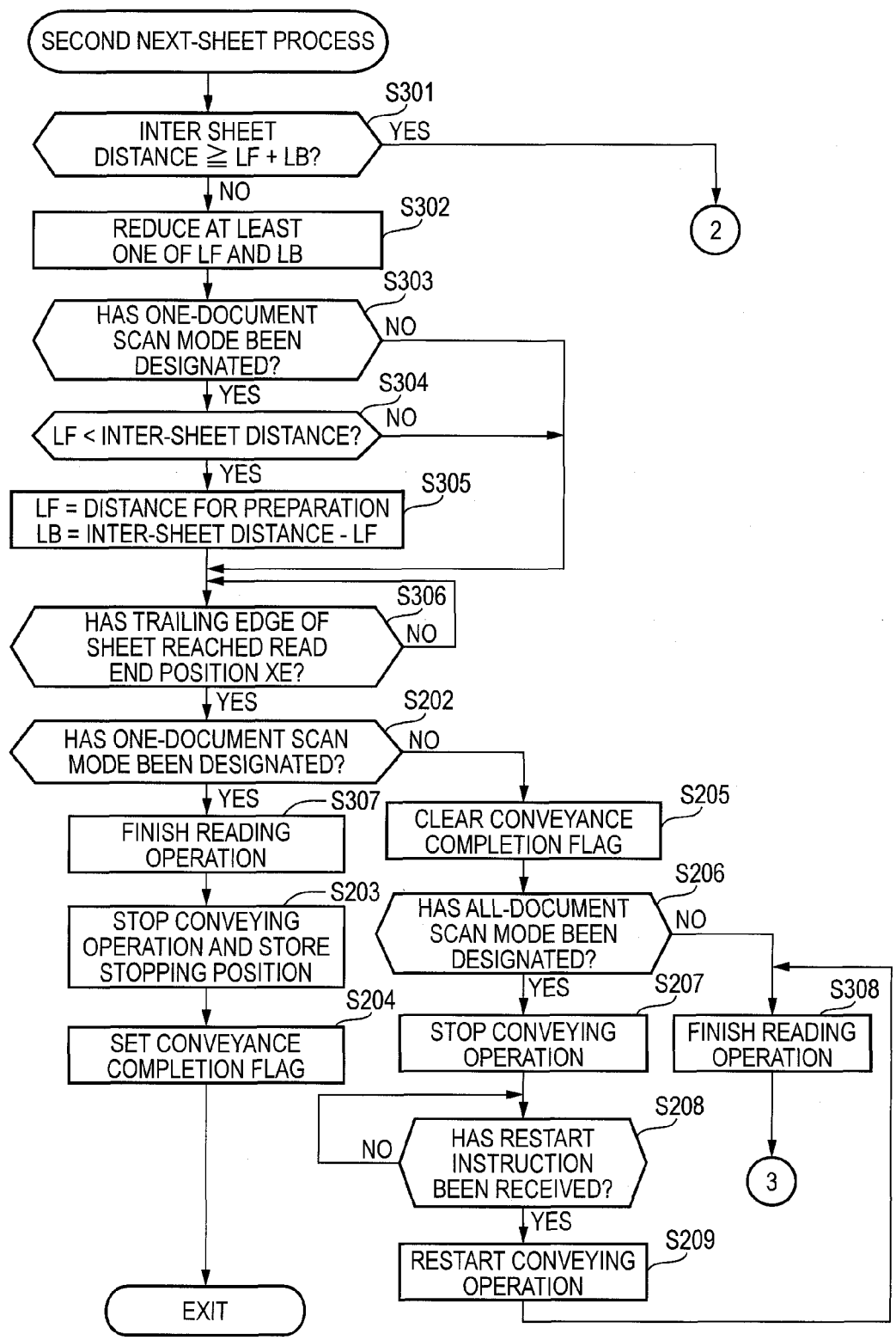
FIG. 6 is a flow chart illustrating a second next-sheet process.
Figure 7:
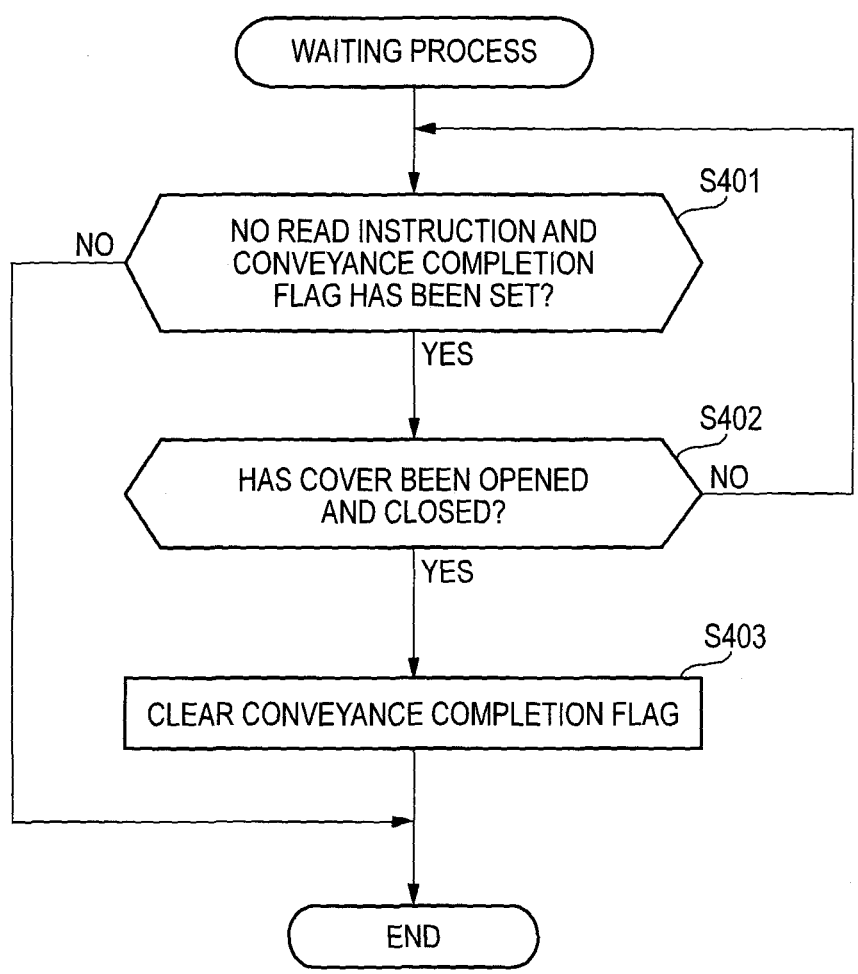
FIG. 7 is a flow chart illustrating a waiting process.

If it is determined in STEP S10 of FIG. 3 that the over-scan mode has been set ("YES" in STEP S10), in STEP S14, the CPU 31 executes a second next-sheet process shown in FIG. 6. First, the CPU 31 determines whether the inter-sheet distance ΔC shown in FIGS. 8 and 9E is a distance capable of securing the leading-edge over-distance LF and the trailing-edge over-distance LB. Specifically, in STEP S301, the CPU 31 determines whether the inter-sheet distance ΔC is equal to or greater than the sum distance of the leading-edge over-distance LF and the trailing-edge over-distance LB. The sum distance is an example of a predetermined distance, and the process of STEP S301 is an example of a distance determining process.

For example, if it is determined in STEP S3 of FIG. 3 that the trailing edge of the sheet C1 being read has reached the pre-reading position X2 ("YES" in STEP S3), the CPU 31 starts to count the number of steps of the motor 4A, and counts the number of steps until it is determined in STEP S9 that the leading edge of the next sheet C2 has reached the pre-reading position X2 ("YES" in STEP S9). Then, the CPU 31 acquires the inter-sheet distance ΔC based on the count value. Here, the through-down distance of the motor 4A may be added to the above described sum distance. The through-down distance is a distance which is caused by follow-up delay or the like, and is a distance by which a sheet C is conveyed after the CPU 31 issues a stop command until the conveyer 4 actually stops.

If it is determined that the inter-sheet distance ΔC is equal to or greater than the sum distance ("YES" in STEP S301), the CPU 31 proceeds to STEP S11 of FIG. 3, finishes the reading operation in STEP S12, and then performs the first next-sheet process in STEP S13. In this case, since the over-scan mode has been set, if the one-document scan mode has been designated ("YES" in STEP S202 of FIG. 5), in STEP S203, the next sheet C2 is stopped at a position where its leading edge has reached the leading-edge over-scan position X3.

Meanwhile, if it is determined that the inter-sheet distance ΔC is not equal to or greater than the sum distance ("NO" in STEP S301), in STEP S302, the CPU 31 sets at least one of the leading-edge over-distance LF and the trailing-edge over-distance LB to a value smaller than its initial value. Then, the CPU 31 proceeds to STEP S303. The process of STEP S302 is an example of a distance changing process. Specifically, for example, the CPU 31 changes each of the leading-edge over-distance LF and the trailing-edge over-distance LB to a value (=ΔC/2) which is half of the inter-sheet distance ΔC.

Therefore, it is possible to suppress occurrence of a situation in which the trailing edge side of the sheet C1 being read or the leading edge side of the next sheet C2 cannot be read within the over-scan range H since the inter-sheet distance ΔC is short. Also, if the leading-edge over-distance LF is set to be short, it is possible to suppress the start timing of an over-scan operation on the next sheet C2 from being before the preparation process has completed.

In STEP S303, the CPU 31 determines whether the one-document scan mode has been designated in the read instruction. The condition in which the one-document scan mode has been designated is an example of an execution condition for executing the acquiring process, and the process of STEP S303 is an example of an acquisition determining process. If it is determined that the one-document scan mode has been designated ("YES" in STEP S303), in STEP S304, the CPU 31 determines whether the leading-edge over-distance LF after the process of STEP S302 is shorter than a distance for preparation. In a case where the position of the leading edge of the sheet C when the sheet C is not inclined is referred to as a leading position, if the leading edge of the sheet C is inclined as much as possible within the inclination allowance range, the leading edge exceeds the leading position in the conveyance direction. A distance by which the leading edge exceeds the leading position in the conveyance direction is defined as the distance for preparation. That is, the CPU 31 determines whether the leading-edge over-distance LF allows the preparation process to be performed even if the sheet C is inclined as much as possible in the inclination allowance range.

Figure 9G:
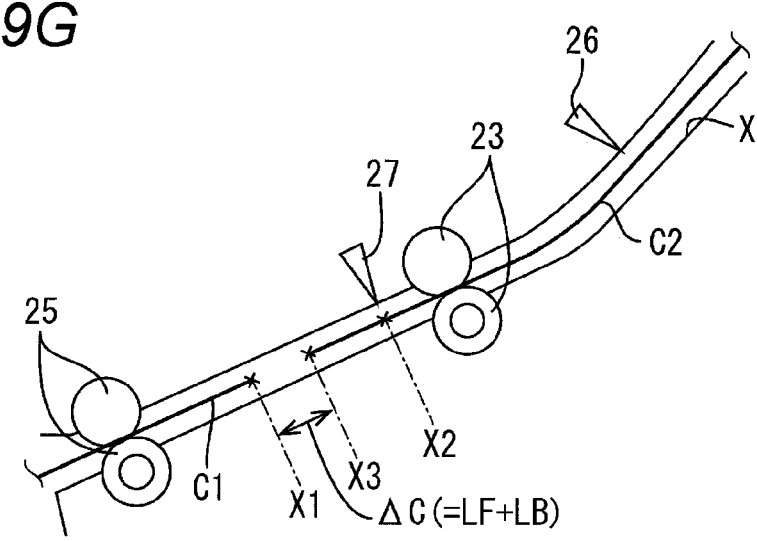
FIG. 9G is a schematic diagram illustrating the positions of sheets on the conveyance path.

If it is determined that the leading-edge over-distance LF is shorter than the distance for preparation ("YES" in STEP S304), in STEP S305, the CPU 31 resets the leading-edge over-distance LF to a value corresponding to the distance for preparation, and sets the trailing-edge over-distance LB to a value obtained by subtracting the leading-edge over-distance LF from the inter-sheet distance ΔC (see FIG. 9G). Then, the CPU 31 proceeds to STEP S306. The process of STEP S305 is an example of the distance changing process. Therefore, although the over-scan range H can become narrow with respect to the trailing edge of the sheet C1 being read, it is possible to suppress the leading edge of the next sheet C2 from reaching the reading position X1 before the preparation process is completed. Also, in view of the above described through-down distance, the trailing-edge over-distance LB may be set to a value obtained by subtracting the leading-edge over-distance LF from the inter-sheet distance ΔC and subtracting the through-down distance from that subtraction result.

Meanwhile, if it is determined that the one-document scan mode has not been designated ("NO" in STEP S303), the CPU 31 proceeds to STEP S306 without performing the process of STEP S305. The reason is that unless the one-document scan mode is designated, it is unnecessary to perform the preparation process before reading of the next sheet C2, and thus it is unnecessary to consider the distance for preparation. Also, if it is determined that the leading-edge over-distance LF is not shorter than the distance for preparation ("NO" in STEP S304), the CPU 31 proceeds to STEP S306 without performing the process of STEP S305. The reason is that unless the leading-edge over-distance LF is shorter than the distance for preparation, even if the next sheet C2 is inclined, its leading edge is unlikely to exceed the reading position X1 such that the preparation process cannot be performed.

In STEP S306, the CPU 31 determines whether the trailing edge of the sheet C1 being read has reached the read end position XE. The subsequent processes except for some processes are identical to the processes of STEPS S202 to S209 of FIG. 5. Therefore, the common processes are denoted by the same reference symbols, and will not be described. Only different processes will be described. If it is determined that the one-document scan mode has been designated ("YES" in STEP S202), in STEP S307, the CPU 31 controls the reading device 24 such that the reading device finishes the reading operation on the sheet C1. Then, the CPU 31 proceeds to STEP S203. Meanwhile, if it is determined that the all-document scan mode has not been designated ("NO" in STEP S206), in STEP S308, the CPU 31 controls the reading device 24 such that the reading device finishes the reading operation on the sheet C1. Then, the CPU 31 proceeds to STEP S13. Further, the CPU 31 controls the conveyer 4 in STEP S209 such that the conveyer 4 restarts the conveying operation, and then proceeds to STEP S13 of FIG. 3.

As described above, in a case where the over-scan mode has been set with respect to the sheet C1 being read ("YES" in STEP S10), if the one-document scan mode has been designated ("YES" in STEP S202 of FIG. 6), in STEP S203 of FIG. 6, the next sheet C2 is stopped if its leading edge reaches the leading-edge over-scan position X3 as shown in FIG. 9G. Meanwhile, as described above, in a case where the over-scan mode has not been set ("NO" in STEP S10), if the one-document scan mode has been designated ("YES" in STEP S202 of FIG. 5), in STEP S203 of FIG. 5, the next sheet C2 is stopped if its leading edge reaches the reading position X1 as shown in FIG. 9E. That is, in a case where the over-scan mode has been set with respect to the sheet C1 being read, the next sheet C2 stops at the more upstream side as compared to a case where the over-scan mode has not been set. Therefore, it is possible to stop the next sheet C2 at an appropriate position according to whether the over-scan mode has been set.

Also, in a case where the one-document scan mode has been designated ("YES" in STEP S303), in STEP S203, the next sheet C2 is stopped as a position where its leading edge has reached a position upstream to the reading position X1 by the leading-edge over-distance LF. Meanwhile, in a case where the one-document scan mode has not been designated ("NO" in STEP S303), in STEP S203, the next sheet C2 is stopped at a position where its leading edge has reached a position upstream to the reading position X1 by a distance which is half of the leading-edge over-distance LF. That is, in a case where the one-document scan mode has been designated, if the next sheet C2 is inclined, it is possible to suppress its leading edge from exceeding the reading position X1 such that the preparation process cannot be performed. Meanwhile, in the case where the one-document scan mode has not been designated, as compared to a configuration in which the next sheet C2 is stopped at the same position as that in a case where the one-document scan mode has been designated, it is possible to start the reading of the next sheet C2 earlier after reception of the read instruction.

Figure 5:
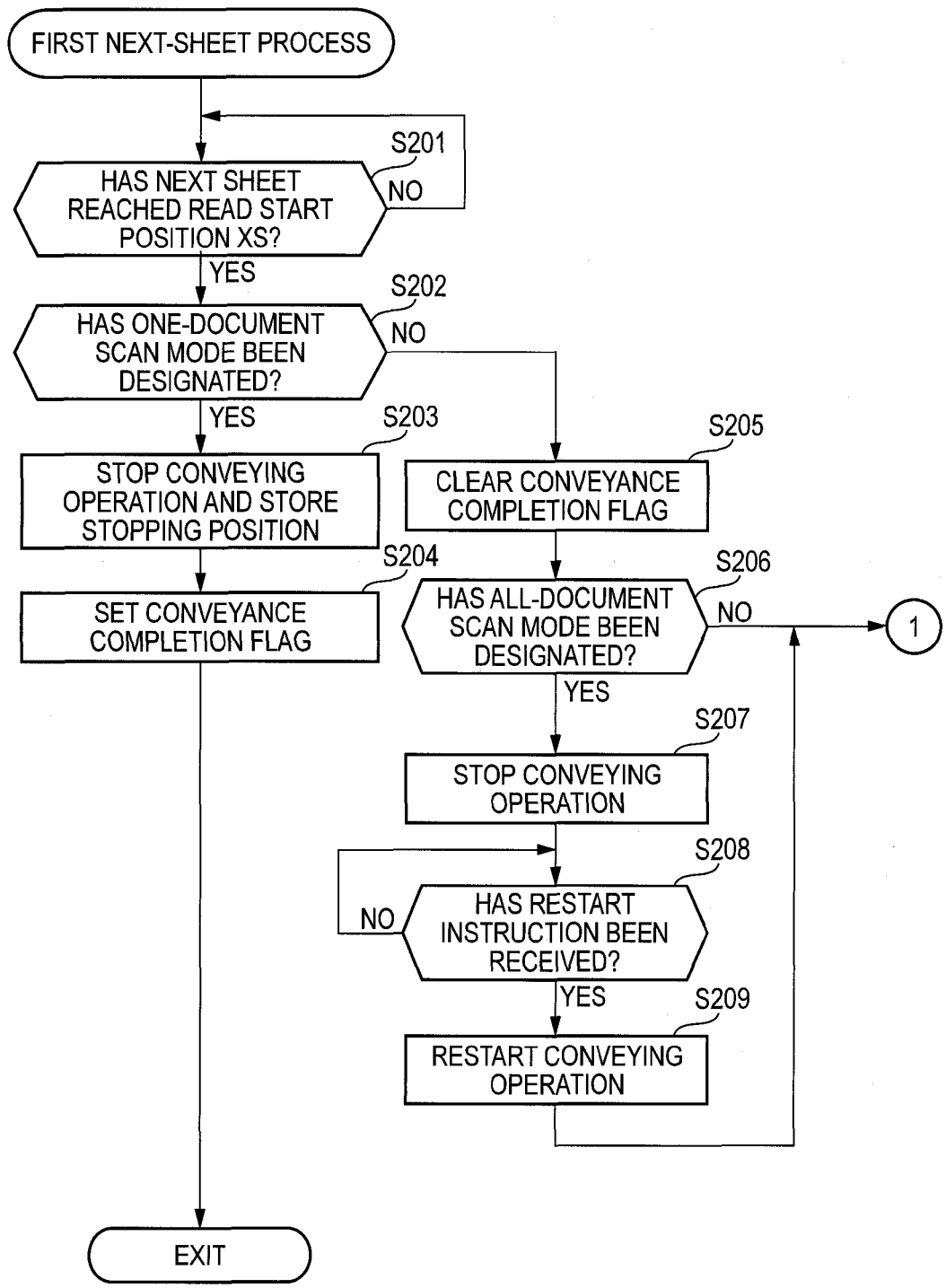
FIG. 5 is a flow chart illustrating a first next-sheet process.

In STEPS S203 and S204 of FIGS. 5 and 6, the CPU 31 stops the next sheet C2 in the conveyance completion state and sets the conveyance completion flag. Then, if it has become a waiting state for waiting for the next read instruction, the CPU 31 performs a waiting process shown in FIG. 7. In STEP S401, the CPU 31 determines whether the operation unit 37 or the like has not received the read instruction and the conveyance completion flag is being set.

If it is determined that a read instruction has not been received and the conveyance completion flag has been set ("YES" in STEP S401), in STEP S402, the CPU 31 determines whether the cover 3B has been opened and closed based on the detection signal SG3 from the cover sensor 28. This process is an example of the detecting process. If it is determined that the cover 3B has been opened and closed ("YES" in STEP S402), the CPU 31 clears the conveyance completion flag in STEP S403, and then finishes the waiting process. The process of STEP S403 is an example of a rewriting process.

By opening and closing the cover, the position of a sheet C in the conveyance completion state may be shifted toward the downstream side. However, the above described rewriting process makes it possible to suppress occurrence of any problems such as a problem in which a sheet C reaches the reading position X1 before the preparation process is completed. If it is determined that a read instruction has been received or the conveyance completion flag has not already been set ("NO" in STEP S401), the CPU 31 finishes the waiting process. Meanwhile, if it is determined that the cover 3B has not been opened and closed ("NO" in STEP S402), the CPU 31 returns to STEP S401.

The technology which is disclosed in this specification is not limited to the embodiment described above with reference to the drawings, and includes, for example, various following forms.

The reading apparatus is not limited to a single scanner, and may be, for example, a copy machine having a reading function and a printing function, a single facsimile having a facsimileing function, or a multi-function apparatus having a plurality of functions such as a copying function and a facsimileing function. Also, the reading apparatus is not limited to a configuration in which the conveyance path is linear, and may be, for example, an apparatus in which the conveyance path is folded back in a U shape.

Also, the reading apparatus may have two reading devices, thereby capable of reading images of both sides of a sheet. For example, the scanner 1 shown in FIG. 1 may include another reading device in addition to the reading device 24. The additional reading device may be provided downstream to the reading position X1 so as to read the image of the opposite side of the sheet C to a side which is read by the reading device 24. In this configuration, the read end position XE of STEP S4 of FIG. 3 or the like may be the read end position of one reading device which is positioned downstream to the other reading device. Also, the read start position XS of STEP S113 of FIG. 4 or the like may be the read start position of one reading device which is positioned upstream to the other reading device. In this case, the above described sum distance of STEP S301 of FIG. 6 may be obtained by adding a gap distance between the reading positions of the two reading devices to the leading-edge over-distance LF and the trailing-edge over-distance LB. If the gap distance is added, whereby the over-scan amount of the trailing edge of the sheet C1 in the upstream reading device is reduced, it is possible to stop the leading edge of the next sheet C2 such that a preparation process relative to the downstream reading device can be performed. Also, with respect to the next sheet C2, it is possible to perform preparation processes relative to both of the two reading devices.

In the above described embodiment, the control device for performing the processes of FIGS. 3 to 7 is configured by one CPU 31. However, the present invention is not limited thereto. The control device for performing the processes of FIGS. 3 to 7 may be configured by a plurality of CPUs, or only by a dedicated hardware circuit such as the ASIC 35, or by a CPU and a hardware circuit.

In the determining process, the CPU 31 may perform the processes of STEPS S101 and S102 of FIG. 4 in the reverse order. Alternatively, the CPU 31 may perform only either of the processes of STEPS S101 and S102. For example, the CPU 31 may determine whether there is any sheet being in the conveyance completion state only based on the determination result of STEP S101. In this case, for example, as compared to a case of detecting a sheet C based on the detection signal SG2 of the rear sensor 27 and using only the detection result thereof, it is possible to accurately determine whether there is any sheet being in the conveyance completion state during reception of a read instruction.

The acquiring process is not limited to the process of adjusting an amount of light or the process of acquiring shading data, and may be, for example, a process of adjusting the light sensitivity of the reading device 24. In short, the acquiring process needs only to be a process of acquiring the read result of the reading device 24 after the operation unit 37 or the like receives a read instruction and before a sheet C reaches the reading position.

In the pre-reading process of FIG. 4, in a case where it is determined that the conveyance completion flag has been set and a sheet C has reached the pre-reading position X2 ("YES" in STEP S101 and "YES" in STEP S102), if it is determined that the over-scan mode has been set ("YES" in STEP S110), the CPU 31 may start the reading operation on the sheet C without waiting the sheet C to reach the read start position XS. Specifically, in FIG. 4, if it is determined that the over-scan mode has been set ("YES" in STEP S110), the CPU 31 may proceed to STEP S2 of FIG. 3, without performing STEPS S111 and S113. Therefore, for example, even in a case where the leading-edge over-distance LF is already shorter than its initial value in STEP S302 or S205 of FIG. 6, it is possible to suppress a problem in which the image of the sheet C cannot be read.

The stop condition and the execution condition for the acquiring process are not limited to the condition in which the one-document scan mode has been designated (STEP S202 of FIGS. 5 and 6), and may be, for example, a condition in which the operation unit 37 or the like has received an instruction for performing the acquiring process, such as a forcible performance instruction, from a user.

If it is determined in STEP S104 of FIG. 4 that the preparation process has been completed ("YES" in STEP S104), in STEP S105, the CPU 31 controls the sheet C being in the conveyance completion state to be started to be conveyed. However, the CPU 31 may control the sheet C being in the conveyance completion state to be started to be conveyed after the preparation process starts (STEP S103) until the preparation process is completed, at a timing when the preparation process can be completed before the leading edge of the sheet C reaches the reading position X1. In short, the preparation process needs only to be completed before the leading edge of the sheet C reaches the reading position X1.

Figure 10:
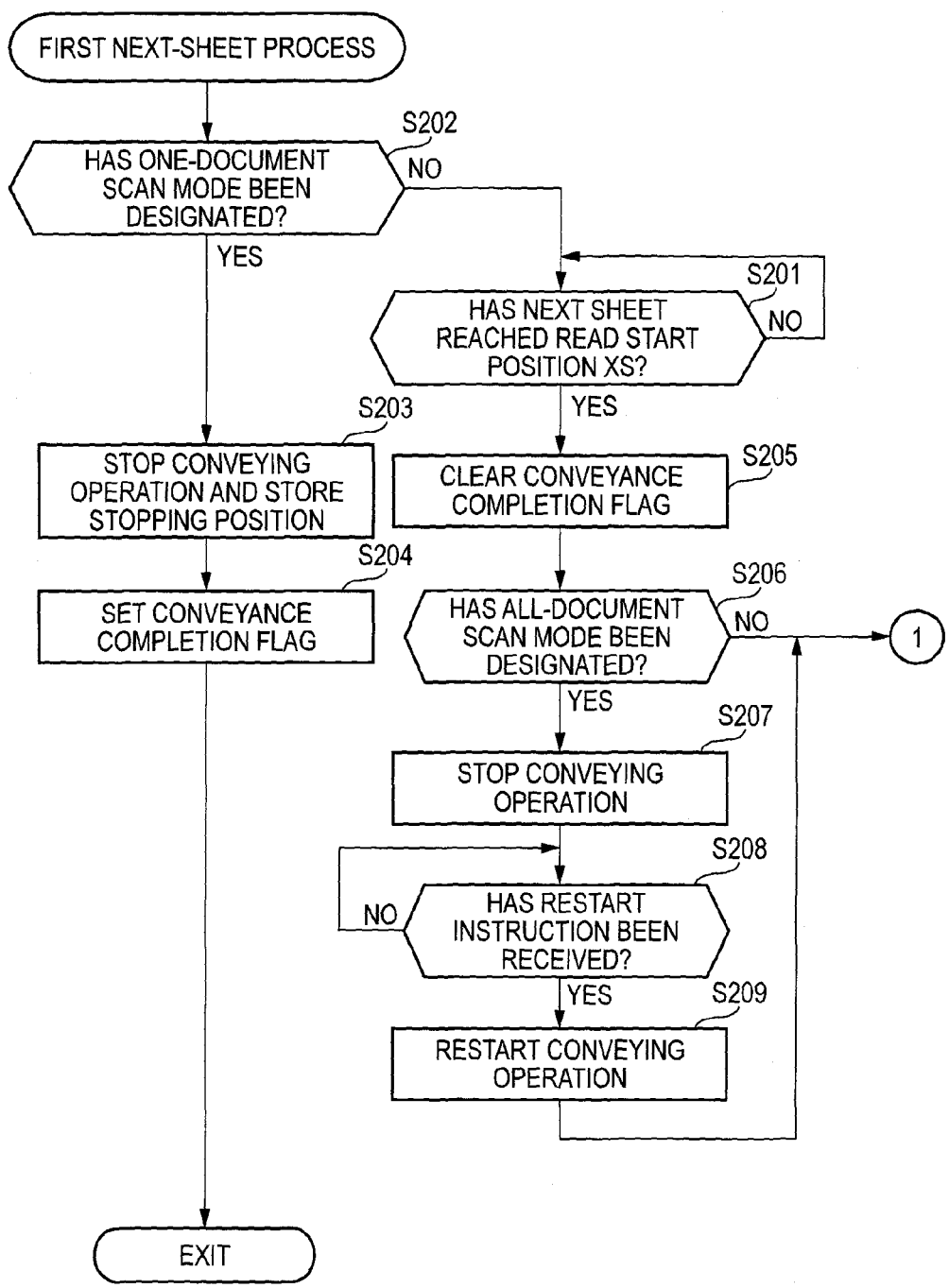
FIG. 10 is a flow chart illustrating a first next-sheet process of another embodiment.

The flow chart shown in FIG. 10 and illustrating a first next-sheet process is different from FIG. 5 in the performance order of STEPS S201 and S202. That is, in a case where it is determined that the one-document scan mode has not been set ("NO" in STEP S202), the CPU 31 waits the leading edge of the next sheet C2 to reach the read start position XS ("YES" in STEP S201), and then causes the conveyer 4 to stop the conveying operation (for example, STEP S207).

Meanwhile, in a case where it is determined that the one-document scan mode has been set ("YES" in STEP S202), although it has been determined in STEP S110 that the over-scan mode had not been set, in STEP S203, the CPU 31 stops the conveying operation without waiting the leading edge of the next sheet C2 to reach the read start position XS. Therefore, it is possible to stop the leading edge of the next sheet C2 at a position on the upstream side from the read start position XS, for example, at the leading-edge over-scan position X3. These processes are an example of a first time changing process.

Therefore, for example, even in a case where the over-scan mode has not been set in the read instruction relative to the sheet C1 but has been set in the read instruction relative to the next sheet C2, it is possible to suppress a problem in which the image of the next sheet C2 cannot be read within the over-scan range H. Here, also in FIG. 6, if it is determined in STEP S202 that the one-document scan mode has been set ("YES" in STEP S202), even in a case where it is determined in STEP S110 that the over-scan mode has not been set, the CPU 31 may stop the next sheet C2 at a position where its leading edge has reached the leading-edge over-scan position X3.

In STEP S203 of FIGS. 5 and 6, the conveyance completion state is a state where the leading edge of a sheet C has stopped at a position reaching the read start position XS. However, the present invention is not limited thereto. The conveyance completion state may be a state where the leading edge of a sheet C has stopped at a position reaching an upstream position from the read start position XS. The upstream position may be, for example, a position upstream to the reading position X1 by a distance equal to or greater than the above described distance for preparation, a position upstream to the reading position X1 by the sum distance of the leading-edge over-distance LF and the distance for preparation, or a position upstream to the reading position X1 by the sum distance of the leading-edge over-distance LF, the trailing-edge over-distance LB, and the distance for preparation.

In the first next-sheet process shown in FIG. 5, if it is determined that the leading edge of the next sheet C2 has reached the read start position XS ("YES" in STEP S201), without performing the process of STEP S202, regardless of whether the over-scan mode has been designated, the CPU 31 may proceed to STEP S203. Also, after the process of STEP S205 is performed, the CPU 31 may proceed to STEP S207 or STEP S2 of FIG. 3, without performing the process of STEP S206.

In the second next-sheet process shown in FIG. 6, after the process of STEP S302 is performed, the CPU 31 may proceed to STEP S306 without performing the processes of STEPS S303 to S305. Also, if it is determined that the one-document scan mode has been designated ("YES" in STEP S303), the CPU 31 may proceed to STEP S306 without performing the process of STEP S304.

In STEP S305 of FIG. 6, the CPU 31 may set the leading-edge over-distance LF to 0 and set the trailing-edge over-distance LB to the same value as the inter-sheet distance ΔC. In this case, although the leading edge of the next sheet C2 may reach the reading position X1 before the preparation process is completed, it is possible to read the trailing edge of the sheet C1 being read within the over-scan range H.

The disclosure provides illustrative, non-limiting aspects as follows:

(1) A reading apparatus including: a reading device; an sheet tray; a conveyer; a receiving device; and a control device configured to: execute, when the receiving device receives a read instruction, a conveying process of causing the conveyer to perform a conveying operation of starting conveyance of a sheet, execute a reading process of causing the reading device to read an image of the sheet conveyed by the conveyer while the sheet is passing a reading position of the reading device, execute a stop determining process of determining whether a stop condition of the conveyer is satisfied, and execute, in response to determining in the stop determining process that the stop condition is satisfied, a stopping process of causing a leading edge of a next sheet, which is a sheet next to the sheet for which the reading process is executed, to be stopped in a stopping position which is any position between the sheet tray and the reading position.

According to the reading apparatus, depending on whether the stop condition is satisfied, the leading edge of the next sheet is stopped in the specific position, or is not stopped. Therefore, it is possible to suppress sheets from being always stopped between a sheet tray and a reading device, resulting in problems.

(2) The reading apparatus according to (1), wherein the control device is further configured to: execute, when the receiving device receives the read instruction, an acquiring process of acquiring a read result of the reading device before the sheet reaches the reading position, and execute an acquisition determining process of determining whether an execution condition for executing the acquiring process is satisfied, and wherein in the stopping process, in a case where it is determined in the acquisition determining process that the execution condition for executing the acquiring process is satisfied, the control device is configured to cause the conveyer to stop the next sheet in a position at a more upstream side in the conveyance direction of the conveyer as compared to a case where it is determined that the execution condition for executing the acquiring process is not satisfied.

According to the reading apparatus, it is possible to suppress the leading edge of the next sheet from exceeding the reading position such that the acquiring process cannot be performed, due to a conveyance state such as inclination of the sheet, or a read condition. Also, as compared to a configuration in which a sheet is stopped at the same position regardless of whether the acquiring process is performed, it is possible to start reading of a sheet earlier after reception of the read instruction.

(3) The reading apparatus according to (1) or (2), further including: a sensor configured to output a signal according to whether there is any sheet in a detection position which is between the sheet tray and the reading position, wherein the control device is further configured to: execute a detecting process of detecting a sheet which is conveyed by the conveyer based on the signal from the sensor, and wherein the stop condition includes detecting the next sheet in the detecting process.

According to the reading apparatus, the leading edge of the next sheet is detected to be positioned between the sheet tray and the reading position based on the signal from the sensor. Therefore, it is possible to reliably stop the next sheet in the conveyance completion state.

(4) The reading apparatus according to any one of (1) to (3), wherein in the reading process, the control device is configured to execute an over-scan mode reading operation in which the reading device is caused to start reading the image when a leading edge of the sheet conveyed by the conveyer reaches an upstream position which is upstream to the reading position by a first distance in the conveyance direction of the conveyer, and wherein the specific position is the upstream position upstream to the reading position by the first distance in the conveyance direction.

According to the reading apparatus, due to the over-scan mode reading operation, it is possible to suppress a situation in which the whole image of a sheet cannot be read due to a read condition or the conveyance state of the sheet. Also, in response to reception of the read instruction, the sheet is conveyed from a state where its leading edge is upstream to the reading position by the first distance. Therefore, it is possible to appropriately perform the over-scan mode reading operation to the sheet.

(5) The reading apparatus according to any one of (1) to (4), wherein in the reading process, the control device is configured to execute an over-scan mode reading operation in which the reading device is caused to start reading an image when a leading edge of the sheet conveyed by the conveyer reaches an upstream position which is upstream to the reading position by a first distance in the conveyance direction of the conveyer, and a non-over-scan mode reading operation in which the reading device is caused to start reading an image when the leading edge of the sheet conveyed by the conveyer reaches the reading position.

According to the reading apparatus, it is possible to perform the over-scan mode reading operation and the non-over-scan mode reading operation.

(6) The reading apparatus according to (5), wherein in the stopping process, in response to determining in the stop determining process that the stop condition is satisfied, the control device is configured to cause the next sheet to be stopped in a state where the leading edge of the next sheet reaches the upstream position upstream to the reading position by the first distance in the conveyance direction.

According to the reading apparatus, in a case where the stop condition is satisfied, the next sheet is stopped in a state where its leading edge reaches the upstream position upstream to the reading position by the first distance in the conveyance direction, and the control device waits for the read instruction relative to the next sheet. Therefore, for example, even in a case where the execution condition for the over-scan mode reading operation is not satisfied with respect to the sheet for which the reading process is executed, but is satisfied with respect to the next sheet, it is possible to appropriately perform the over-scan mode reading operation to the next sheet.

(7) The reading apparatus according to (5), wherein the control device is further configured to: execute an over-scan mode determining process of determining whether an execution condition for executing the over-scan mode reading operation is satisfied, and wherein in the stopping process, in a case where it is determined in the over-scan mode determining process that the execution condition for executing the over-scan mode reading operation is satisfied, the control device is configured to cause the next sheet to be stopped in a position on a more upstream side as compared to a case where it is determined that the execution condition for executing the over-scan mode reading operation is not satisfied.

According to the reading apparatus, as compared to a configuration where the sheet is stopped at the same position as that in a case where the over-scan mode reading operation has been set even in a case where the over-scan mode reading operation has not been set, it is possible to start the reading of the next sheet earlier after reception of the read instruction.

(8) The reading apparatus according to any one of (5) to (7), wherein the control device is further configured to: execute an over-scan mode determining process of determining whether an execution condition for executing the over-scan mode reading operation is satisfied, execute a conveyance determining process of determining whether there is a sheet whose leading edge is in the specific position, and execute, in response to determining in the conveyance determining process that there is a sheet whose leading edge is in the specific position, a first time changing process of making a time until starting of the over-scan mode reading operation after conveyance of the sheet to be shorter in a case where it is determined in the over-scan mode determining process that the execution condition for the over-scan mode reading operation is satisfied than in a case where it is determined in the over-scan mode determining process that the execution condition for the over-scan mode reading operation is not satisfied.

According to the reading apparatus, in a case where the execution condition for the over-scan mode reading operation is satisfied, it is possible to suppress the distance of the over-scan mode reading operation from becoming short.

(9) The reading apparatus according to any one of (5) to (8), further including: a storage device, wherein the control device is further configured to: execute an over-scan mode determining process of determining whether an execution condition for executing the over-scan mode reading operation is satisfied, execute a conveyance determining process of determining whether the leading edge of the next sheet is in the specific position, and execute, when the leading edge of the next sheet is stopped in the specific position, a storing process of storing a stopping position of the sheet whose leading edge is stopped in the specific position in the storage device, and wherein, in response to determining in the conveyance determining process that the leading edge of the next sheet is in the specific position and determining in the over-scan mode determining process that the execution condition for executing the over-scan mode reading operation is not satisfied with respect to the sheet for which the reading process is executed, the control device determines, based on the stopping position, a read start timing for starting reading the image by the reading device after conveyance of the next sheet.

According to the reading apparatus, it is possible to use the stopping position where the leading edge of the next sheet is stopped in the specific position to determine the read start timing to start image reading of the reading device after conveyance of the next sheet.

(10) The reading apparatus according to any one of (1) to (9), wherein in the reading process, the control device is configured to execute an over-scan mode reading operation in which the reading device is caused to start reading the image when a leading edge of the sheet conveyed by the conveyer reaches an upstream position which is upstream to the reading position by a first distance in the conveyance direction of the conveyer, and wherein the control device is further configured to: execute a distance determining process of determining whether an inter-sheet distance between a sheet which is conveyed by the conveyer and a next sheet is equal to or greater than a predetermined distance, and execute, in a case where it is determined in the distance determining process that the inter-sheet distance is not equal to or greater than the predetermined distance, a distance changing process of setting the first distance with respect to the next sheet to be shorter than in a case where it is determined that the inter-sheet distance is equal to or greater than the predetermined distance.

According to the reading apparatus, since the first distance is set to be short, it is possible to suppress a situation where the trailing edge of the sheet conveyed by the conveyer is erroneously read during the over-scan mode reading operation on the leading edge side of the next sheet.

(11) The reading apparatus according to any one of (1) to (10), wherein in the reading process, the control device is configured to execute an over-scan mode reading operation in which the reading device is caused to start reading the image when a trailing edge of a sheet which is conveyed by the conveyer reaches an downstream position which is downstream to the reading position by a second distance in the conveyance direction of the conveyer, and wherein the control device is further configured to: execute a distance determining process of determining whether an inter-sheet distance between a sheet which is conveyed by the conveyer and a next sheet is equal to or greater than a predetermined distance, and execute, in a case where it is determined in the distance determining process that the inter-sheet distance is not equal to or greater than the predetermined distance, a distance changing process of setting the second distance with respect to the sheet being conveyed to be shorter than in a case where it is determined that the inter-sheet distance is equal to or greater than the predetermined distance.

According to the reading apparatus, since the second distance is set to be short, it is possible to suppress a situation where the leading edge of the next sheet is erroneously read during the over-scan mode reading operation on the trailing edge side of the sheet being conveyed.

(12) The reading apparatus according to any one of (1) to (11), further including a storage device, wherein the reading device includes a first reading device, and a second reading device that is disposed downstream to the first reading device in the conveyance direction of the conveyer, wherein in the reading process, the control device is configured to execute a double-side reading operation in which the first reading device is caused to read an image on one side of a sheet and the second reading device is caused to read an image on an other side of the sheet, wherein, the control device is further configured to: execute, when the leading edge of the next sheet is stopped in the specific position, a storing process of storing a stopping position of the sheet whose leading edge is stopped in the specific position in the storage device, and wherein the control device is configured to determine, based on the stopping position, a read start timing for starting reading the image by the second reading device after conveyance of the next sheet.

According to the reading apparatus, it is possible to use the stopping position of the next sheet whose leading edge is stopped in the specific position to determine the read start timing to start image reading of the second reading device after conveyance of the next sheet.

(13) The reading apparatus according to (1), wherein the control device is further configured to: execute, when the receiving device receives the read instruction, an acquiring process of acquiring a read result of the reading device before the sheet reaches the reading position, execute, when the receiving device receives the read instruction, a conveyance determining process of determining whether there is a sheet whose leading edge is stopped in the specific position, and execute a second time changing process of making a time until starting of conveyance of the sheet after the receiving device receives the read instruction to be longer in a case where it is determined in the conveyance determining process that there is a sheet whose leading edge is stopped in the specific position than in a case where it is determined in the conveyance determining process that there is no sheet whose leading edge is stopped in the specific position.

According to the reading apparatus, as compared to a case where the time from when a read instruction is received to when conveyance of a sheet starts is fixed regardless of the conveyance start positions of the sheet, it is possible to suppress the time from when the read instruction is received to when the sheet is started to be read from becoming longer uniformly, while suppressing a sheet from reaching the reading position X1 before the acquiring process is completed.

(14) The reading apparatus according to (13), wherein in the second time changing process, in the case where it is determined in the conveyance determining process that there is a sheet whose leading edge is stopped in the specific position, the control device causes the sheet to be started to be conveyed after the acquiring process is completed, and in the case where it is determined in the conveyance determining process that there is no sheet whose leading edge is stopped in the specific position, the control device causes the sheet to be started to be conveyed before the acquiring process is completed.

According to the reading apparatus, it is possible to reliably suppress a sheet from reaching the reading position before the acquiring process is completed.

(15) The reading apparatus according to (13) or (14), wherein in the reading process, the control device is configured to execute an over-scan mode reading operation in which the reading device is caused to start reading the image when a leading edge of the sheet reaches an upstream position which is upstream to the reading position by a first distance in the conveyance direction of the conveyer, wherein the control device is further configured to: execute an over-scan mode determining process of determining whether an execution condition for executing the over-scan mode reading operation is satisfied, and wherein, in a case where it is determined in the over-scan mode determining process that the execution condition for the over-scan mode reading operation is satisfied, the specific position is a position where the leading edge of a sheet has reached the upstream position which is upstream to the reading position by the first distance in the conveyance direction.

According to this reading apparatus, in a case where a leading edge of a sheet is in the specific position, it is possible to start reading of the sheet earlier after reception of the read instruction, while suppressing a situation in which a portion of the image of the sheet cannot be read even when a sheet is conveyed in an inclined state.

(16) The reading apparatus according to (15), wherein in the stopping process, in a case where it is determined in the over-scan mode determining process that the execution condition for executing the over-scan mode reading operation is not satisfied, the control device is configured to cause the sheet to be stopped in a more downstream position than a position in a case where it is determined that the execution condition for executing the over-scan mode reading operation is satisfied.

According to the reading apparatus, as compared to a configuration where the sheet is stopped at the same position as that in a case where the over-scan mode reading operation has been set even in a case where the over-scan mode reading operation has not been set, it is possible to start the reading of the next sheet earlier after reception of the read instruction.

(17) The reading apparatus according to any one of (13) to (16), further including: a storage device, wherein the control device is further configured to: execute, when a leading edge of a sheet is stopped in the specific position, a storing process of storing information representing that there is a sheet whose leading edge is stopped in the specific position in the storage device, and wherein in the conveyance determining process, the control device is configured to determine that there is a sheet whose leading edge is stopped in the specific position when the information representing that there is a sheet whose leading edge is stopped in the specific position is stored in the storage device.

According to the reading apparatus, for example, as compared to a case where a sheet is detected at the stopping position based on the signal from the sensor and only the detection result thereof is used, it is possible to accurately determine whether there is a sheet whose leading edge is in the specific position when the read instruction is received.

(18) The reading apparatus according to (17), further including: a sensor configured to output a signal according to whether there is a sheet in a detection position between the sheet tray and the reading position, wherein in the conveyance determining process, the control device is configured to determine that there is a sheet whose leading edge is stopped in the specific position when the information representing that there is a sheet whose leading edge is stopped in the specific position is stored in the storage device and a sheet has been detected based on the signal of the sensor.

According to the reading apparatus, as compared to a case of using only information on whether information representing that a sheet whose leading edge is in the specific position has been stored in the storage device, during reception of the read instruction, it is possible to accurately determine whether there is any sheet whose leading edge is in the specific position.

(19) The reading apparatus according to (18), wherein, when the receiving device receives the read instruction, when information representing that there is a sheet whose leading edge is in the specific position is stored in the storage device and a sheet has not been detected based on the signal of the sensor, the control device is configured to execute an error process by which an error operation is performed.

According to the reading apparatus, it is possible to notify the user or the like of an abnormal state, for example, that a sheet is removed from the stopping position before a read instruction is received.

(20) The reading apparatus according to (18) or (19), further including: a cover configured to move between an opened position in which the cover exposes the stopping position and a closed position in which the cover covers the stopping position; and a cover sensor configured to output a signal according to the position of the cover, wherein the control device is further configured to: execute a detecting process of detecting the opening and closing of the cover based on the signal from the cover sensor, and execute, when it is detected in the detecting process that the cover has been opened and closed after the information representing that there is a sheet whose leading edge is in the specific position is stored in the storage device until the receiving device receives the read instruction, a rewriting process of storing information representing that there is no sheet whose leading edge is in the specific position instead of the information representing that there is a sheet whose leading edge is in the specific position.

By opening and closing the cover, the position of a sheet whose leading edge is in the specific position may be shifted toward the downstream side. However, according to the reading apparatus, it is possible to suppress a sheet from reaching the reading position before the acquiring process is completed.

(21) The reading apparatus according to any one of (13) to (20), wherein in the reading process, the control device is configured to execute a first reading process of reading one sheet, then stopping the leading edge of the next sheet in the specific position and waiting for reception of the read instruction, and a second reading process of reading one sheet and reading the next sheet without waiting for the read instruction, wherein the control device is further configured to: execute a read determining process of determining whether an execution condition for executing the first reading process is satisfied, and wherein the stop condition includes determining in the read determining process that the execution condition for the first reading process is satisfied.

According to the reading apparatus, in the first reading process, before receiving the read instruction to the next sheet, it is possible to stop the leading edge of the next sheet in the specific position.

(22) The reading apparatus according to any one of (13) to (21), wherein the control device is further configured to: execute an acquisition determining process of determining whether an execution condition for executing the acquiring process is satisfied, and wherein, in a case where it is determined in the acquisition determining process that the execution condition is not satisfied, in the second time changing process, the control device is configured to make a time until starting conveyance of a sheet after receiving the read instruction by the receiving device to be shorter than in a case where it is determined that the execution condition is satisfied.

According to the reading apparatus, even in a case where the execution condition for the acquiring process is not satisfied, it is possible to suppress the time from when the read instruction is received to when the sheet is started to be read from becoming longer uniformly.

The reading apparatus according to (1), wherein the leading edge of the next sheet is in the specific position after the execution of the reading process for the sheet has been completed.

What is claimed is:
1. A reading apparatus comprising:
  a reading device comprising a light source and a light receiver;
  a sheet tray;
  a conveyer;
  a receiving device; and
  a control device comprising a processor and a memory storing instructions which, when executed by the processor, cause the control device to:

execute, when the receiving device receives a read instruction, a conveying process of causing the conveyer to perform a conveying operation of starting conveyance of a sheet, execute a reading process of causing the reading device to read an image of the sheet conveyed by the conveyer while the sheet is passing a reading position of the reading device, execute a stop determining process of determining whether a stop condition of the conveyer is satisfied, and execute, in response to determining in the stop determining process that the stop condition is satisfied, a stopping process of causing a leading edge of a next sheet, which is a sheet next to the sheet for which the reading process is executed, to be stopped in a specific position which is any position between the sheet tray and the reading position, wherein in the reading process, the control device is caused to execute an over-scan mode reading operation in which the reading device is caused to start reading the image when a leading edge of the sheet conveyed by the conveyer reaches an upstream position which is upstream to the reading position by a first distance in the conveyance direction of the conveyer.

2. The reading apparatus according to claim 1, further comprising:

a sensor configured to output a signal according to whether there is any sheet in a detection position which is between the sheet tray and the reading position, wherein the control device is further caused to:

execute a detecting process of detecting a sheet which is conveyed by the conveyer based on the signal from the sensor, and wherein the stop condition includes detecting the next sheet in the detecting process.

3. The reading apparatus according to claim 1, wherein the specific position is the upstream position upstream to the reading position by the first distance in the conveyance direction.

4. The reading apparatus according to claim 3, wherein in the reading process, the control device is caused to execute a non-over-scan mode reading operation in which the reading device is caused to start reading an image when the leading edge of the sheet conveyed by the conveyer reaches the reading position.

5. The reading apparatus according to claim 4, wherein in the stopping process, in response to determining in the stop determining process that the stop condition is satisfied, the control device causes the next sheet to be stopped in a state where the leading edge of the next sheet reaches the upstream position upstream to the reading position by the first distance in the conveyance direction.

6. The reading apparatus according to claim 4, wherein the control device is further caused to:

execute an over-scan mode determining process of determining whether an execution condition for executing the over-scan mode reading operation is satisfied, and wherein in the stopping process, in a case where it is determined in the over-scan mode determining process that the execution condition for executing the over-scan mode reading operation is satisfied, the control device causes the next sheet to be stopped in a position on a more upstream side as compared to a case where it is determined that the execution condition for executing the over-scan mode reading operation is not satisfied.

7. The reading apparatus according to claim 4, wherein the control device is further caused to:

execute an over-scan mode determining process of determining whether an execution condition for executing the over-scan mode reading operation is satisfied, execute a conveyance determining process of determining whether there is a sheet whose leading edge is in the specific position, and execute, in response to determining in the conveyance determining process that there is a sheet whose leading edge is in the specific position, a time changing process of making a time until starting of the over-scan mode reading operation after conveyance of the sheet to be shorter in a case where it is determined in the over-scan mode determining process that the execution condition for the over-scan mode reading operation is satisfied than in a case where it is determined in the over-scan mode determining process that the execution condition for the over-scan mode reading operation is not satisfied.

8. The reading apparatus according to claim 4, further comprising:

a storage device, wherein the control device is further caused to:

execute an over-scan mode determining process of determining whether an execution condition for executing the over-scan mode reading operation is satisfied, execute a conveyance determining process of determining whether the leading edge of the next sheet is in the specific position, and execute, when the leading edge of the next sheet is stopped in the specific position, a storing process of storing a stopping position of the sheet whose leading edge is stopped in the specific position in the storage device, and wherein, in response to determining in the conveyance determining process that the leading edge of the next sheet is in the specific position and determining in the over-scan mode determining process that the execution condition for executing the over-scan mode reading operation is not satisfied with respect to the sheet for which the reading process is executed, the control device determines, based on the stopping position, a read start timing for starting reading the image by the reading device after conveyance of the next sheet.

9. The reading apparatus according to claim 1, wherein the control device is further caused to:

execute a distance determining process of determining whether an inter-sheet distance between a sheet which is conveyed by the conveyer and a next sheet is equal to or greater than a predetermined distance, and execute, in a case where it is determined in the distance determining process that the inter-sheet distance is not equal to or greater than the predetermined distance, a distance changing process of setting the first distance with respect to the next sheet to be shorter than in a case where it is determined that the inter-sheet distance is equal to or greater than the predetermined distance.

10. The reading apparatus according to claim 1, wherein in the over-scan mode reading operation, the reading device is caused to read the image until a trailing edge of a sheet which is conveyed by the conveyer reaches an downstream position which is downstream to the reading position by a second distance in the conveyance direction of the conveyer, and wherein the control device is further caused to:
    execute a distance determining process of determining whether an inter-sheet distance between a sheet which is conveyed by the conveyer and a next sheet is equal to or greater than a predetermined distance, and
    execute, in a case where it is determined in the distance determining process that the inter-sheet distance is not equal to or greater than the predetermined distance, a distance changing process of setting the second distance with respect to the sheet being conveyed to be shorter than in a case where it is determined that the inter-sheet distance is equal to or greater than the predetermined distance.

11. The reading apparatus according to claim 1, further comprising a storage device,
wherein the reading device includes a first reading device, and a second reading device that is disposed downstream to the first reading device in the conveyance direction of the conveyer,
wherein in the reading process, the control device is caused to execute a double-side reading operation in which the first reading device is caused to read an image on one side of a sheet and the second reading device is caused to read an image on an other side of the sheet,
wherein, the control device is further caused to:
    execute, when the leading edge of the next sheet is stopped in the specific position, a storing process of storing a stopping position of the sheet whose leading edge is stopped in the specific position in the storage device, and
wherein the control device is caused to determine, based on the stopping position, a read start timing for starting reading the image by the second reading device after conveyance of the next sheet.

12. The reading apparatus according to claim 1,
wherein the leading edge of the next sheet is in the specific position after the execution of the reading process for the sheet has been completed.

13. A reading apparatus comprising:
a reading device comprising a light source and a light receiver;
a sheet tray;
a conveyer;
a receiving device; and
a control device comprising a processor and a memory storing instructions which, when executed by the processor, cause the control device to:
    execute, when the receiving device receives a read instruction, a conveying process of causing the conveyer to perform a conveying operation of starting conveyance of a sheet,
    execute a reading process of causing the reading device to read an image of the sheet conveyed by the conveyer while the sheet is passing a reading position of the reading device,
    execute a stop determining process of determining whether a stop condition of the conveyer is satisfied,
    execute in response to determining in the stop determining process that the stop condition is satisfied, a stopping process of causing a leading edge of a next sheet, which is a sheet next to the sheet for which the reading process is executed, to be stopped in a specific position which is any position between the sheet tray and the reading position,
    execute, when the receiving device receives the read instruction, an acquiring process of acquiring a read result of the reading device before the sheet reaches the reading position, and
    execute an acquisition determining process of determining whether an execution condition for executing the acquiring process is satisfied, and
wherein in the stopping process, in a case where it is determined in the acquisition determining process that the execution condition for executing the acquiring process is satisfied, the control device causes the conveyer to stop the next sheet in a position at a more upstream side in the conveyance direction of the conveyer as compared to a case where it is determined that the execution condition for executing the acquiring process is not satisfied.

14. A reading apparatus comprising:
a reading device comprising a light source and a light receiver;
a sheet tray;
a conveyer;
a receiving device; and
a control device comprising a processor and a memory storing instructions which, when executed by the processor, cause the control device to:
    execute a conveying process of causing the conveyer to perform a conveying operation of starting conveyance of a sheet,
    execute a reading process of causing the reading device to read an image of the sheet conveyed by the conveyer while the sheet is passing a reading position of the reading device,
    execute, when the receiving device receives the read instruction, an acquiring process of acquiring a read result of the reading device before the sheet reaches the reading position,
    execute, when the receiving device receives the read instruction, a conveyance determining process of determining whether there is a sheet whose leading edge is stopped in a specific position which is any position between the sheet tray and the reading position, and
    execute a time changing process of making a time until starting of conveyance of the sheet after the receiving device receives the read instruction to be longer in a case where it is determined in the conveyance determining process that there is a sheet whose leading edge is stopped in the specific position than in a case where it is determined in the conveyance determining process that there is no sheet whose leading edge is stopped in the specific position.

15. The reading apparatus according to claim 14,
wherein in the time changing process, in the case where it is determined in the conveyance determining process that there is a sheet whose leading edge is stopped in the specific position, the control device causes the sheet to be started to be conveyed after the acquiring process is completed, and in the case where it is determined in the conveyance determining process that there is no sheet whose leading edge is stopped in the specific position, the control device causes the sheet to be started to be conveyed before the acquiring process is completed.

16. The reading apparatus according to claim 14,
wherein in the reading process, the control device is caused to execute an over-scan mode reading operation in which the reading device is caused to start reading the image when a leading edge of the sheet reaches an upstream position which is upstream to the reading position by a first distance in the conveyance direction of the conveyer, wherein the control device is further caused to:
execute an over-scan mode determining process of determining whether an execution condition for executing the over-scan mode reading operation is satisfied, and wherein, in a case where it is determined in the over-scan mode determining process that the execution condition for the over-scan mode reading operation is satisfied, the specific position is a position where the leading edge of a sheet has reached the upstream position which is upstream to the reading position by the first distance in the conveyance direction.

17. The reading apparatus according to claim 16,
wherein the control device is further caused to:
execute a stop determining process of determining whether a stop condition of the conveyer is satisfied,
execute, in response to determining in the stop determining process that the stop condition is satisfied, a stopping process of causing a leading edge of a next sheet, which is a sheet next to the sheet for which the reading process is executed, to be stopped in the specific position, and
wherein in the stopping process, in a case where it is determined in the over-scan mode determining process that the execution condition for executing the over-scan mode reading operation is not satisfied, the control device is causes the sheet to be stopped in a more downstream position than a position in a case where it is determined that the execution condition for executing the over-scan mode reading operation is satisfied.

18. The reading apparatus according to claim 14, further comprising:
a storage device,
wherein the control device is further caused to:
execute, when a leading edge of a sheet is stopped in the specific position, a storing process of storing information representing that there is a sheet whose leading edge is stopped in the specific position in the storage device, and
wherein in the conveyance determining process, the control device is caused to determine that there is a sheet whose leading edge is stopped in the specific position when the information representing that there is a sheet whose leading edge is stopped in the specific position is stored in the storage device.

19. The reading apparatus according to claim 18, further comprising:
a sensor configured to output a signal according to whether there is a sheet in a detection position between the sheet tray and the reading position,
wherein in the conveyance determining process, the control device is caused to determine that there is a sheet whose leading edge is stopped in the specific position when the information representing that there is a sheet whose leading edge is stopped in the specific position is stored in the storage device and a sheet has been detected based on the signal of the sensor.

20. The reading apparatus according to claim 19,
wherein, when the receiving device receives the read instruction, when information representing that there is a sheet whose leading edge is in the specific position is stored in the storage device and a sheet has not been detected based on the signal of the sensor, the control device is caused to execute an error process by which an error operation is performed.

21. The reading apparatus according to claim 19, further comprising:
a cover configured to move between an opened position in which the cover exposes the stopping position and a closed position in which the cover covers the stopping position; and
a cover sensor configured to output a signal according to the position of the cover,
wherein the control device is further caused to:
execute a detecting process of detecting the opening and closing of the cover based on the signal from the cover sensor, and
execute, when it is detected in the detecting process that the cover has been opened and closed after the information representing that there is a sheet whose leading edge is in the specific position is stored in the storage device until the receiving device receives the read instruction, a rewriting process of storing information representing that there is no sheet whose leading edge is in the specific position instead of the information representing that there is a sheet whose leading edge is in the specific position.

22. The reading apparatus according to claim 14,
wherein the control device is further caused to:
execute a stop determining process of determining whether a stop condition of the conveyer is satisfied,
execute, in response to determining in the stop determining process that the stop condition is satisfied, a stopping process of causing a leading edge of a next sheet, which is a sheet next to the sheet for which the reading process is executed, to be stopped in the specific position,
wherein in the reading process, the control device is caused to execute a first reading process of reading one sheet, then stopping the leading edge of the next sheet in the specific position and waiting for reception of the read instruction, and a second reading process of reading one sheet and reading the next sheet without waiting for the read instruction,
wherein the control device is further caused to:
execute a read determining process of determining whether an execution condition for executing the first reading process is satisfied, and
wherein the stop condition includes determining in the read determining process that the execution condition for the first reading process is satisfied.

23. The reading apparatus according to claim 14,
wherein the control device is further caused to:
execute an acquisition determining process of determining whether an execution condition for executing the acquiring process is satisfied, and
wherein, in a case where it is determined in the acquisition determining process that the execution condition is not satisfied, in the time changing process, the control device is caused to make a time until starting conveyance of a sheet after receiving the read instruction by the receiving device to be shorter than in a case where it is determined that the execution condition is satisfied.

* * * * *